United States Patent [19]

Hamano et al.

[11] Patent Number: 5,896,418
[45] Date of Patent: *Apr. 20, 1999

[54] DATA TRANSMISSION SYSTEM HAVING A COMMUNICATION CONTROL COMPUTER FOR CONTROLLING COMMUNICATION BETWEEN A COMMUNICATION INTERFACE MODULE AND TERMINAL DEVICES

[75] Inventors: Fumio Hamano, Katsuta; Shigeru Oho, Hitachi; Takeshi Hirayama, Mito; Akira Hasegawa, Katsuta, all of Japan

[73] Assignee: Hitachi, Ltd., Tokyo, Japan

[*] Notice: This patent is subject to a terminal disclaimer.

[21] Appl. No.: 08/332,049

[22] Filed: Nov. 1, 1994

Related U.S. Application Data

[62] Division of application No. 08/045,087, Mar. 22, 1993, abandoned, which is a division of application No. 07/646,435, Jan. 28, 1991, Pat. No. 5,224,124, which is a division of application No. 07/470,776, Jan. 26, 1990, Pat. No. 5,113,410, which is a continuation of application No. 07/016,518, Feb. 17, 1987, abandoned, which is a continuation of application No. 06/619,998, Jun. 12, 1984, abandoned.

[30] Foreign Application Priority Data

Jun. 16, 1983 [JP] Japan .................. 58-106666

[51] Int. Cl.[6] .................. G06F 13/00; G06F 17/40
[52] U.S. Cl. .................. 375/259; 375/220; 340/825.08; 701/29; 701/33
[58] Field of Search .................. 340/870.18, 870.39, 340/438, 825.06, 825.07, 825.08, 146.2, 463; 375/219, 222, 257, 258, 259; 364/424.01; 701/29, 30, 31, 32, 33, 34; 371/21.2, 21.4, 22.1, 22.5, 22.6, 24, 3, 2.2

[56] References Cited

U.S. PATENT DOCUMENTS

| | | | |
|---|---|---|---|
| 3,958,088 | 5/1976 | Vieri | 379/100 |
| 4,270,205 | 5/1981 | DeShon | 371/32 |
| 4,806,905 | 2/1989 | McGowan, III | 340/310.02 |

Primary Examiner—Chi H. Pham
Assistant Examiner—William Luther
Attorney, Agent, or Firm—Antonelli, Terry, Stout & Kraus, LLP

[57] ABSTRACT

In a data transmission system having a data processing unit (MPU) and a communication control unit (CIM) and capable of transmitting a data to a local control unit (LCU) in a half duplex mode, the data processing unit receives the data by an interruption based on an end of data reception signal supplied from the communication control unit.

5 Claims, 17 Drawing Sheets

F I G. 1
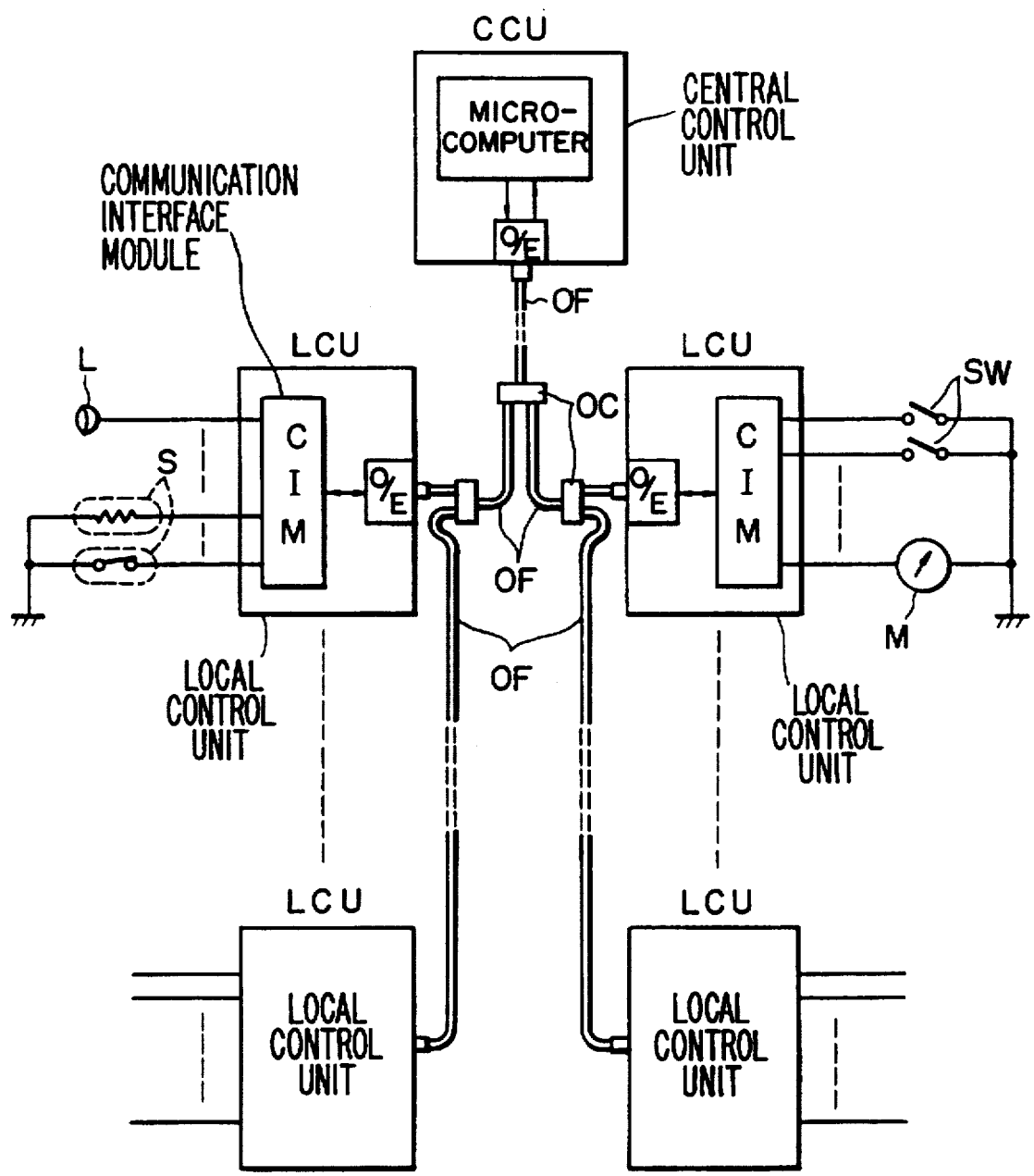

F I G. 5

| BIT NO. | MPU MODE | | DIO MODE | | AD MODE | |
|---|---|---|---|---|---|---|
| 0 | $D_0$ | | "0" | | $AD_0$ | |
| 1 | $D_1$ | | "0" | | $AD_1$ | |
| 2 | $D_2$ | | "0" | Unused | $AD_2$ | |
| 3 | $D_3$ | MPU DATA | "0" | | $AD_3$ | AD DATA |
| 4 | $D_4$ | (Register 3) | "0" | | $AD_4$ | |
| 5 | $D_5$ | | "0" | | $AD_5$ | |
| 6 | $D_6$ | | DIO | | $AD_6$ | |
| 7 | $D_7$ | | DIO | | $AD_7$ | |
| 8 | $D_0$ | | DIO | | $ADCH_0$ | AD CHANNEL DATA |
| 9 | $D_1$ | | DIO | | $ADCH_1$ | |
| 10 | $D_2$ | | DIO | | DIO | |
| 11 | $D_3$ | MPU DATA | DIO | | DIO | |
| 12 | $D_4$ | (Register 2) | DIO | DIO DATA | DIO | |
| 13 | $D_5$ | | DIO | | DIO | |
| 14 | $D_6$ | | DIO | | DIO | DIO DATA |
| 15 | $D_7$ | | DIO | | DIO | |
| 16 | $D_0$ | | DIO | | DIO | |
| 17 | $D_1$ | | DIO | | DIO | |
| 18 | $D_2$ | | DIO | | DIO | |
| 19 | $D_3$ | MPU DATA | DIO | | DIO | |
| 20 | $D_4$ | (Register 1) | $ADDR_0$ | | $ADDR_0$ | |
| 21 | $D_5$ | | $ADDR_1$ | ADDRESS DATA | $ADDR_1$ | ADDRESS DATA |
| 22 | $D_6$ | | $ADDR_2$ | | $ADDR_2$ | |
| 23 | $D_7$ | | $ADDR_3$ | | $ADDR_3$ | |
| 24 | "1" (START BIT) | | "1" (START BIT) | | "1" (START BIT) | |

| ADDRESS | MODE |
|---------|------|
| S0 | MPU |
| S1~SD | DIO |
| SE. SF | AD |

FIG. 14
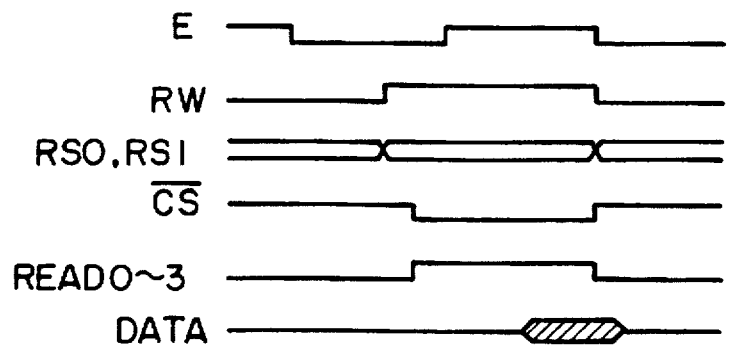
FIG. 15
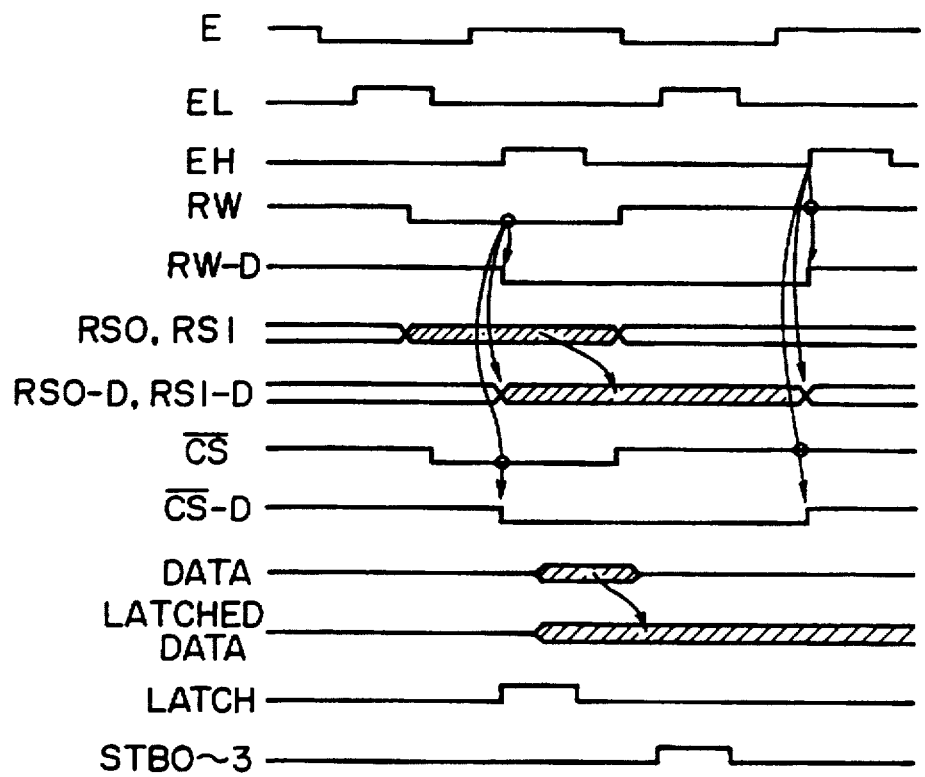
FIG. 16
| RS0 | RS1 | SELECTION |
|-----|-----|-----------|
| 0 | 0 | IRQ MASKING AND RELEASE |
| 0 | 1 | Reg 1 |
| 1 | 0 | Reg 2 |
| 1 | 1 | Reg 3 |

DATA TRANSMISSION SYSTEM HAVING A COMMUNICATION CONTROL COMPUTER FOR CONTROLLING COMMUNICATION BETWEEN A COMMUNICATION INTERFACE MODULE AND TERMINAL DEVICES

CROSS REFERENCES TO RELATED APPLICATIONS

This application is a divisional of application Ser. No. 08/045,087, filed Mar. 22, 1993, now abandoned; which is a divisional of application Ser. No. 07/646,435, filed Jan. 28, 1991, now U.S. Pat. No. 5,224,124, issued Jun. 29, 1993; which is a divisional of application Ser. No. 07/470,776, filed Jan. 26, 1990, now U.S. Pat. No. 5,113,410, issued May 12, 1992; which is a continuation of application Ser. No. 07/016,518, filed Feb. 17, 1987, now abandoned; which is a continuation of application Ser. No. 06/619,998, filed Jun. 12, 1984, now abandoned.

BACKGROUND OF THE INVENTION

The present invention relates to a multiplex data transmission system, and more particularly to a data transmission system which is suitable for use as a compact wiring system providing multiplex transmission in an automobile.

An automobile is equipped with a number of electric devices and parts, such as lamps, motors, sensors and actuators, and the number of those electric devices and parts can be expected to increase as the automobile is provided with more electronic features.

Thus, if those large number of electric devices are individually wired, the wiring would become very complex and of large scale, and serious problems, such as increases in cost, weight and space and mutual interferences in signal transmission will occur.

One of the methods to resolve the above problems is simplification of wiring by a multiplex data transmission system which enables the transmission of a large number of signals with a small number of wirings. This is described in a Japanese patent application 17535/82 (corresponding to U.S. patent application Ser. No. 464,212).

In the disclosed transmission system, signals are transmitted between a plurality of terminal stations (LCU) and a central station (CCU) through a common transmission line. Each LCU has one or more detection means or control means, or combinations thereof. The CCU has a digital computer for controlling the signal transmission between the CCU and the LCUs. This computer is used not only for the signal transmission but also other processings. The content of the processings differs from system to system. Examples of such processings are operation to generate the signals to be transmitted and diagnosis of failure in the system. Accordingly, a system which efficiently utilizes the computer of the CCU to achieve such functions is required.

SUMMARY OF THE INVENTION

It is an object of the present invention to provide a data transmission system which eliminates wasteful non-operation time required for the CCU digital computer to receive data so that the processing performance of the digital computer is fully utilized.

In order to achieve the above object, in accordance with the present invention, the CCU computer processes the received data in accordance with an interruption by an end of data reception signal which is generated at the end of the reception of the data.

BRIEF DESCRIPTION OF THE DRAWINGS

The present invention will be apparent from the following detailed description taken in conjunction with the accompanying drawings, in which:

FIG. 1 illustrates a compact wiring system for an automobile.

FIG. 5 illustrates an example of a data content.

FIGS. 14 and 15 are timing charts for explaining the operations of FIGS. 12 and 13.

FIG. 16 illustrates a select operation by a register select signal.

DETAILED DESCRIPTION OF THE PREFERRED EMBODIMENTS

In the system of FIG. 1, optical fiber cables OF are used as signal transmission lines, and a central control unit CCU and a plurality of local control units LCU are interconnected by a common optical signal channel. An optical branch connector OC is arranged at each branching point of the optical fiber cables OF.

The CCU is located near the dashboard of the automobile or other appropriate position and controls the overall system.

A necessary number of LCUs are distributedly located near various electric devices in the automobile such as control switches SW, meters M, lamps L and sensors S.

An opto-electrical converting module O/E for converting an optical signal to an electrical signal or vice versa is arranged at each coupling point of the CCU or LCU and the optical fiber cable OF.

The CCU has a digital computer (e.g. microcomputer) and a serial data communication function, and each LCU has a communication interface module CIM. The CCU sequentially selects one of the LCUs, exchanges data with the selected LCU and repeats the above operation so that multiplex transmission is attained through one channel of optical fiber cables OF and a complex and large scale wiring system of the automobile is simplified.

Figure 2:
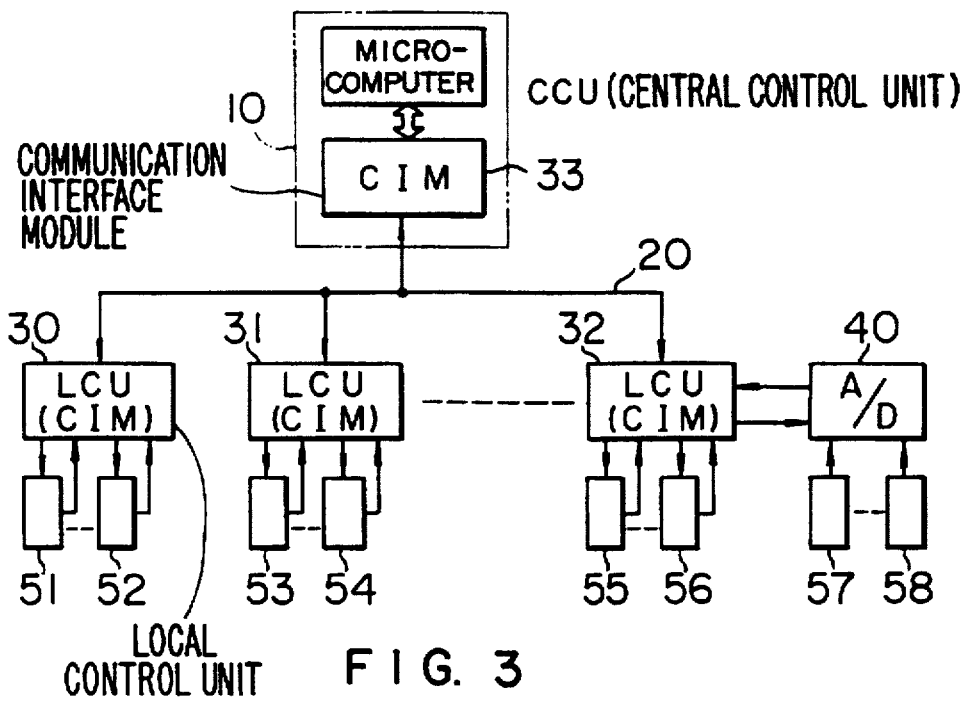
FIG. 2 is a block diagram of one embodiment of a data transmission system.

One example of a data transmission system used in the compact wiring system for the automobile is shown in FIG. 2.

FIG. 2 is a block diagram of an overall data transmission system. Numeral 10 denotes a central control unit (corresponding to the CCU in FIG. 1), numeral 20 denotes a signal transmission line (corresponding to the optical fiber cable OF in FIG. 1), numerals 30–32 denote local control units (corresponding to the LCU in FIG. 1), numeral 40 denotes an A/D and numeral 51–58 denote external loads. In the present example, the signal transmission line 20 is an electrical signal transmission line. Accordingly, no opto-electric conversion module is required for the CCU 10 and the LCUs 30–32, and each of the LCUs 30–32 essentially comprises only the CIM.

The CCU 10 having a digital computer (e.g. microcomputer) is coupled to the LCUs 30–32 through the transmission line 20, and sends out data to the external loads 51–58 which are electric devices such as sensors, lamps, actuators and motors and reads in data therefrom in the multiple transmission mode. The external loads 57 and 58 which are sensors for producing analog data are coupled to the LCU 32 through the A/D 40 so that the data is digitally transmitted.

The signal transmission line 20 may be any bilateral transmission line and it is not limited to the electrical signal transmission system, but an optical signal transmission system using the optical fiber or any other system may be used. The communication mode is a so-called half duplex mode in which data is alternately transmitted and received between one of the LCUs 30–32 and the CCU 10 in response to a call from the CPU 10 to the selected one of the LCUs 30–32.

Because of the multiplex transmission in the half duplex mode, the message sent out of the CCU 10 carries a destination address and only one of the LCUs which identifies that the destination address attached to the message received from the transmission line 20 corresponds to its own unit address responds to the message.

Thus, the data transmission in the half duplex mode is attained by the operation of the LCUs in which only one of the LCUs which identifies its own address from the message sent from the CCU 10 responds to the message to send data to the CCU 10.

In the present embodiment, the functions of the LCUs 30–32 are limited to specific ones to facilitate the LSI implementation of the LCUs 30–32. The specific functions in the present embodiment are a data transmission function, that is, a function necessary for the multiplex transmission and a function of controlling the external device, such as A/D 40 associated with the LCUs As a result, the data transmission function is made independent, and when it is applied to the compact wiring system for the automobile, the half duplex mode is used and a transmission rate and the number of address bits may be determined accordingly.

In the present multiplex transmission system, the functions of the LSI LCU are utilized as they are and can be applied to the CCU 10. As a result, the CCU 10 may be constructed by combining the LSI CIM 33 with a general purpose computer (e.g. microcomputer) having no data transmission function. The CIM 33 can be a LCU. Thus, the software burden to the computer of the CCU 10 is reduced and the generality of the CIM is enhanced. In this case, however, a portion of the functions of the CIM 33 combined with the CCU is not utilized.

Figure 3:
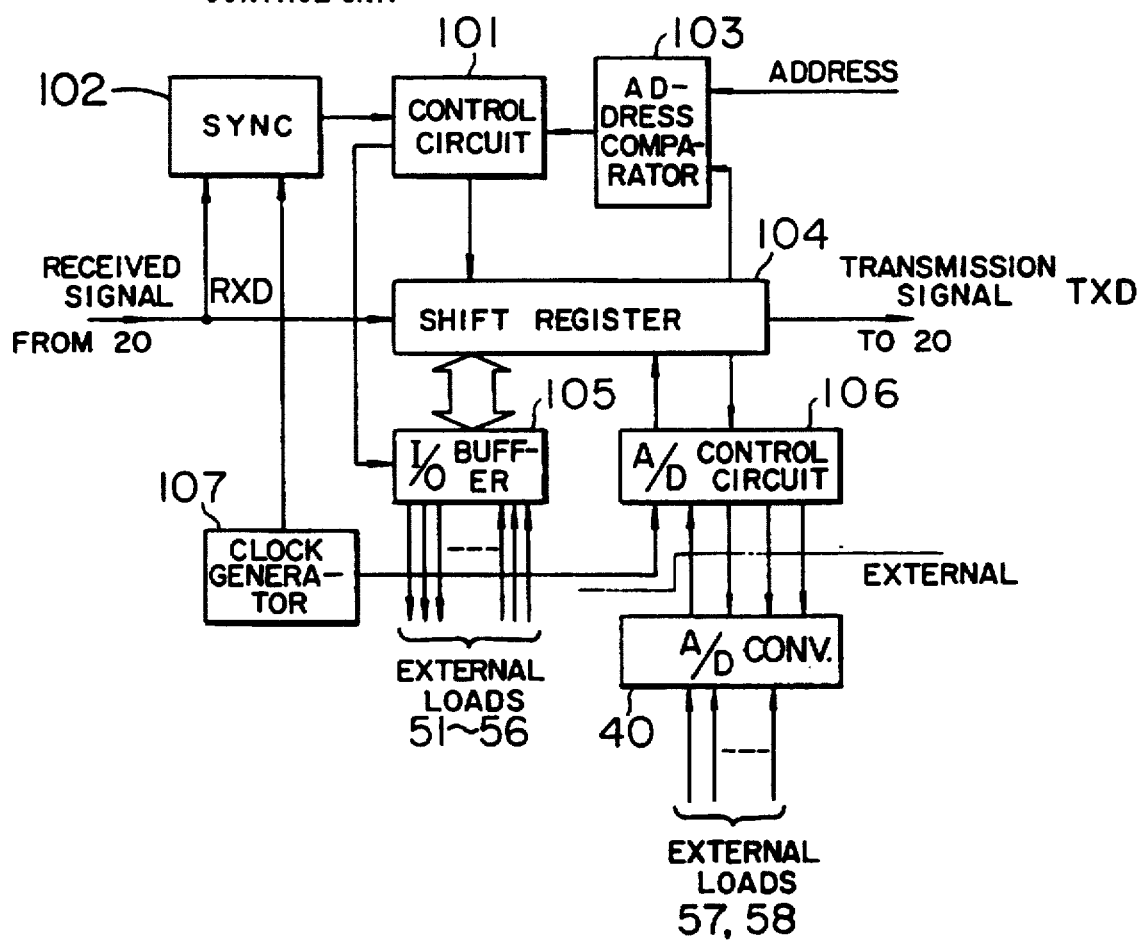
FIG. 3 is a block diagram of one embodiment of a local control unit.

FIG. 3 is a block diagram of an embodiment of the LCUs 30–32. A received signal RXD from the transmission line 20 is supplied to a synchronization circuit 102 which synchronizes the signal RXD with a clock from a clock generator 107 to supply a signal component of the RXD synchronized with the clock to a control circuit 101, which in turn generates a control signal to serially write the address component and the data component of the received signal RXD into a shift register 104.

On the other hand, an address comparator 103 contains an address assigned to the LCU. The stored address and the received address component written into predetermined bit positions of the shift register 104 are compared by the address comparator 103, and if they are equal, the data component in the shift register 104 is transferred to an I/O buffer 105, thence it is supplied to the external device.

The control circuit 101 has a counter which is advanced by the clock. It generates a sequential control signal to transfer the data component in the received signal RXD to the I/O buffer 105 and then parallelly write data into the shift register 104 from the I/O buffer 105 to prepare in the shift register 104 serial data to be transmitted from the external devices to the CCU 10. The data is serially shifted out of the shift register 104 and sent out to the transmission line 20 as a transmission signal TXD. Since the component attached to the received signal RXD is also attached to the transmission signal TXD, the CCU 10 reads in the transmission signal TXD when the address component attached to the signal TXD matches the address sent out by the CCU 10. In this manner, one cycle of data exchange in the half duplex mode is completed.

The CCU 10 then sends out the data for the next LCU and repeats the above operation so that data is exchanged periodically with a plurality of LCUs 30–32 and the multiplex transmission is attained.

An A/D control circuit 106 controls the A/D 40 when the LCU is used as the LCU 32 shown in FIG. 2. It imparts a control function necessary to digitize the data from the external loads 57 and 58 such as sensors which produce analog signals by the A/D 40 and read the digital data into the shift register 104.

Figure 4:
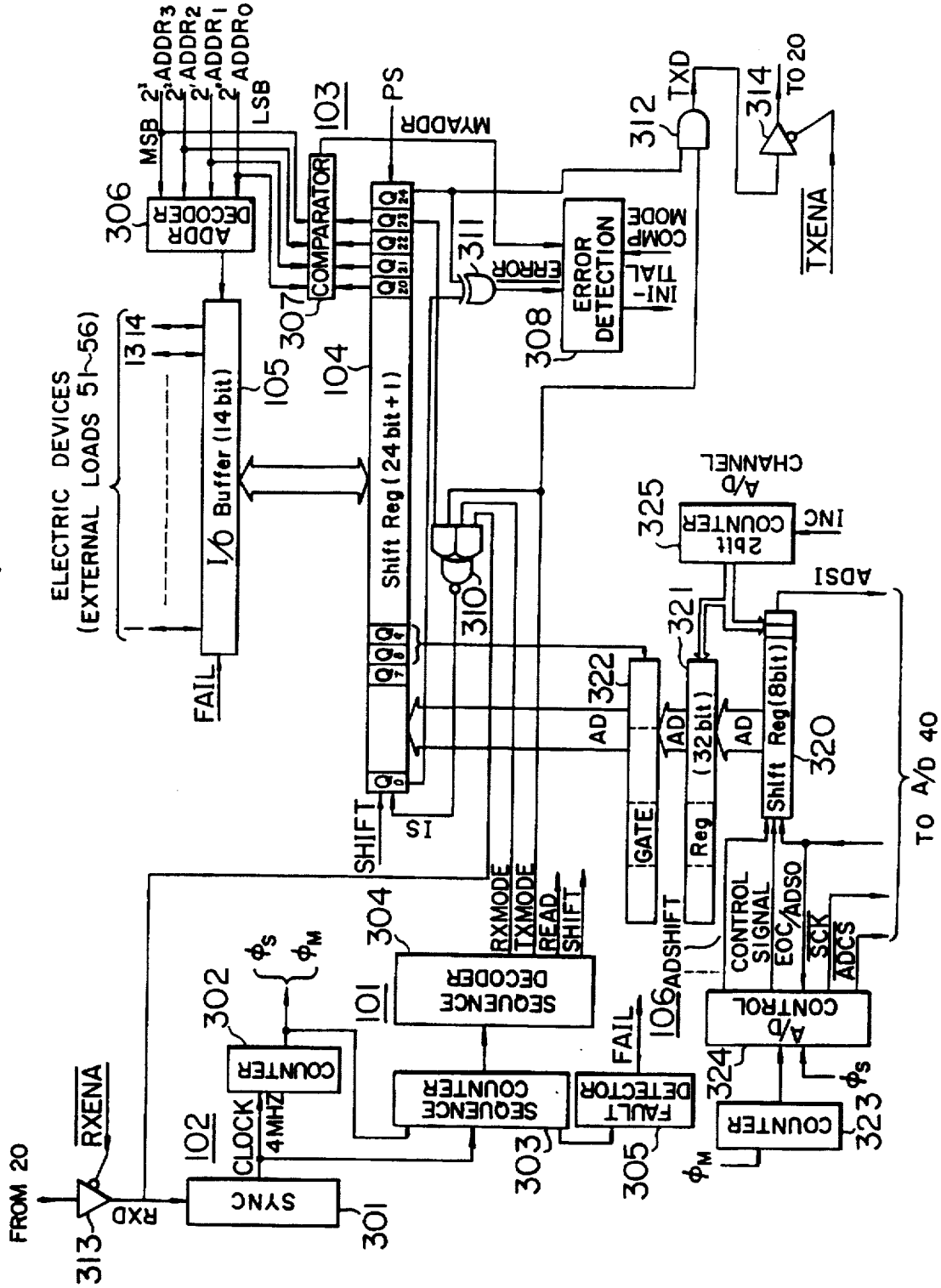
FIG. 4 is a detailed block diagram of FIG. 3.

FIG. 4 shows one embodiment of the CIM of the present invention which can be used as the CIM 33 or one of the LCUs 30–32 in the system of FIG. 2. In FIG. 4, elements similar to those shown in FIG. 3 are designated by like reference numerals. More particularly, numeral 301 denotes a synchronization circuit which generates a clock signal synchronized with the received signal RXD, numeral 302 denotes a counter which generates two-phase clock signals $\phi_S$ and $\phi_M$, numeral 303 denotes a sequential control counter, numeral 304 denotes a sequence decoder which produces various control signals in a desired sequence based on the output of the counter 303, numeral 305 denotes a fault detector, numeral 306 denotes an address decoder for selecting inputs/outputs of the I/O buffer 105, numeral 307 denotes a 4-bit comparator for address comparison, numeral 308 denotes an error detection circuit, numeral 310 denotes a composite gate including two AND gates and one NOR gate, numeral 311 denotes an Exclusive OR gate for error detection, numeral 312 denotes an AND gate for data transmission, numerals 313 and 314 denotes tri-state buffers, numeral 320 denotes an 8-bit shift register, numeral 321 denotes a 32-bit register, numeral 322 denotes a 32-channel gate, numeral 323 denotes an A/D control counter, numeral 324 denotes an A/D control signal generating circuit, and numeral 325 denotes an A/D channel selection counter. The shift register 104 has 25 bits (24 bits+1 bit) and the I/O buffer 105 has 14 ports (14 bits).

The LCUs 30–32 (hereinafter referred to as CIMS) and the CIM 33 each operates in a selected one of a plurality of operation modes. When it is used as the CIMs 30–31 of FIG. 2, a DIO mode is selected, when it is used as the CIM 32 of FIG. 2, an AD mode is selected, and when it is used as the CIM 33 of FIG. 2, an MPU mode is selected. The mode selection will be described later.

When the DIO mode is selected, the A/D control circuit 106 is not operated. The data content of the shift register 104 is shown in FIG. 5. As shown therein, six bits No. 0 to No. 5 are not used and 14 bits No. 6 to No. 19 are assigned to the data DIO of the I/O buffer 105. Four bits No. 20–No. 23 are assigned to the address data ADDR and a bit No. 24 is assigned to a status bit. The 14 bits are assigned to the DIO data because the I/O buffer 105 has 14 bits. In the CIM of the present embodiment, a maximum number of external loads connectable to the I/O buffer 105 is 14.

Figures 6, 7:
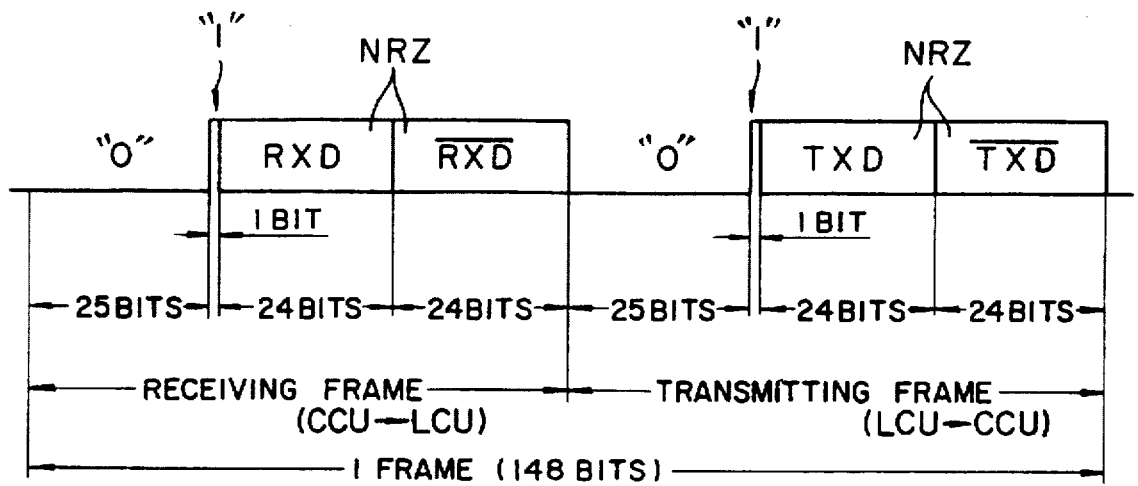
FIG. 6 shows an example of transmission waveform.
FIG. 7 shows an example of mode selection.

The data transmission system in the present embodiment is a step synchronized, bilateral, reversed double transmission system, in which the digital data is transmitted in an NRZ (non-return to zero) mode. The transmission waveform is shown in FIG. 6. A frame for transmitting the data from the CCU CIM to the LCU CIM is called a receiving frame, and a frame for transmitting the data from the LCU CIM to the CCU CIM is called a transmitting frame. Both the receiving frame and the transmitting frame have 74 bits and hence one frame has 148 bits. The receiving frame and the transmitting frame have the same frame configuration, in which the first 25 bits are "0" followed by one "1" start bit for clock synchronization, followed by 24-bit received data RXD or transmission data TXD in the NRZ form, followed by the inverted data RXD or TXD. The inverted data RXD or TXD is transmitted for a purpose of transmission error check.

As described above, in the present embodiment, the multiplex transmission is attained by the half duplex system. Accordingly, the address data ADDR of the LCU to be called by the CCU is contained in the first four bits of the receiving frame data RXD, as shown in FIG. 5, and the same address data ADDR is contained in the first four bits of the transmitting frame data TXD sent from the LCU. Since only the LCU called by the CCU sends the transmission frame, the CCU can immediately determine the source LCU of the data even if the address data is not attached to the transmission data TXD. Accordingly, the transmitting frame data TXD need not necessarily contain the address and the first four bits of the data TXD may contain "0000" which does not match any LCU address.

Turning back to FIG. 4, the CIM address is explained.

As described above, in the present embodiment, the four-bit address is assigned to each LCU CIM and the multiplex data transmission in the half duplex system is attained in accordance with the address.

Four inputs $2^0$–$2^3$ to a comparator 307 function to assign the address to the CIM. The address of the CIM is designated by the data ADDR0–ADDR3 applied to those inputs. For example, in order to designate the address of the CIM to "10", the address data ADDR0 is set to "0", ADDR1 is set to "1", ADDR2 is set to "0" and ADDR3 is set to "1" so that "1010" is applied to the inputs $2^0$–$2^2$. In the present embodiment, the data "0" is represented by ground potential and the data "1" is represented by a power supply voltage Vcc. Thus, for the address "10", the inputs $2^0$ and $2^2$ are grounded and the inputs $2^0$ and $2^3$ are connected to the power supply.

In the present embodiment, the address inputs $2^0$–$2^3$ are also supplied to an address decoder 306 and the output thereof controls the direction of the I/O buffer 105. As a result, when the address is designated, some of 14 terminals of the I/O buffer 105 are selected as data output ports. In the present embodiment, the address corresponds to the number of output ports. For example, when the address "10" is designated, 10 of the 14 terminals of I/O buffer are used as the output ports and the remaining four terminals are used as input ports.

While not shown in FIG. 4, the output of the address decoder 306 is also supplied to the sequence decoder 304 of the control circuit 101 so that the operation mode of the CIM is switched as shown in FIG. 7. In the present embodiment, when the address is "0", the CIM is operated in the MPU mode, when the address is between "1" and "D", the CIM is operated in the DIO mode, and when the address is "E" or "F", the CIM is operated in the AD mode.

The functions of the control circuit 101 and the synchronization circuit 102 are explained below.

As explained in FIG. 6, the present embodiment uses the step synchronization system. Therefore, the 25 "0" bits followed by one "1" start bit are inserted before the start of the data transmission, in both the receiving frame and the transmitting frame (see FIG. 6).

The synchronization circuit 301 detects the rise of the start bit following the first 25 "0" bits in the receiving frame in order to bit-synchronize the internal clock. Until the next receiving frame appears, the operation is controlled by the internal clock which is bit-synchronized with the current timing.

The counter 302 generates two-phase clock signals $\phi_S$ and $\phi_M$ from the internal clock synchronized by the synchronization circuit 302. Thus, the clock signals $\phi_S$ and $\phi_M$ are phase-synchronized with the subsequent incoming received data RXD.

When the sequence counter 303 receives a signal representing the detection timing of the rise of the start bit from the synchronization circuit 302, it is set to a specified count, for example, count 0, and counted up by the clock signal $\phi_S$ or $\phi_M$. Accordingly, the control procedure of the CIM can be determined by the count and the stepping of the CIM operation at any timing can be determined by the count.

Thus, the count output of the counter 303 is supplied to the sequence decoder 304 which generates all necessary internal control signals for the CIM such as RXMODE, TXMODE, READ and SHIFT. In the present embodiment, the sequence is controlled by the clock signals $\phi_S$ and $\phi_M$ and all necessary controls are attained by decoding the output of the counter 303.

The operation to determine whether the transmitted data RXD is for the CIM of that LCU or not, that is, whether the call from the CCU for the transmission of the receiving frame is for the CIM of that LCU is explained.

As explained before, the address data from the inputs $2^0$–$2^3$ is supplied to one input of the comparator 307 and the data of the bits $Q_{20}$–$Q_{23}$ of the shift register 104 is supplied to the other input of the comparator 307. The comparator produces an equal signal MYADDR only when both inputs thereto are equal. The received data RXD is supplied to the shift register 104, the output signal MYADDR of the comparator 307 is checked at the timing when the address data (see FIG. 5) attached to the head of the data RXD is stored at the bits $Q_{20}$–$Q_{23}$, and if the signal MYADDR is "1", it is determined that the data RXD is addressed to that unit and the call from the CCU is to that unit.

A control signal COMPMODE is supplied to the error detector 308 which reads in the signal MYADDR at the predetermined timing described above, and if it is "0", the error detector 308 produces an output INITIAL to reset the sequence counter 303 to "0" to reset the operation of the overall CIM to prepare for the next data transmission. On the other hand, if the signal MYADDR is "1", the error detector 308 does not produce the output INITIAL and the operation of the CIM is continued in accordance with the count of the sequence counter 303.

The transmission error detection operation will now be explained.

In the present embodiment, the reversal double transmission data transmission is used as shown in FIG. 6, in order to detect any transmission error. The first bit $Q_0$ and the last bit $Q_{24}$ of the shift register 104 are supplied to an Exclusive OR gate 311 and the output of the gate 311 is supplied to the error detector 308 as a signal ERROR.

During the transmission period of the received signals RXD and RXD (FIG. 6) following the start bit, the sequence decoder 304 produces the control signal RXMODE to open a lower gate of the composite gate 310 so that the data from the transmission line 20 is supplied to the shift register 104 as a serial signal SI. Since the composite gate includes the NOR gate, the data supplied from the transmission line 20 is inverted and supplied to the shift register 104.

When the data of the 24 bits following the start bit in the receiving frame (FIG. 6) is supplied to the shift register 104, the inverted data RXD of the received signal RXD is written into the bits $Q_0$–$Q_{23}$ of the shift register 104. As seen from FIG. 6, when the 24-bit inverted signal RXD is received following the transmission of the 24-bit received signal RXD, the inverted signal RXD is inverted by the composite gate 310 to produce the data RXD which is written into the shift register 104 as a serial signal SI. As a result, at the timing when the inversion of the start bit of the inverted signal RXD is inputted to $Q_0$ of the shift register 104, the inversion of the start bit of the received signal RXD previously written is shifted to $Q_{24}$ of the shift register 104, and at the timing when the second bit of the inverted signal RXD is written into $Q_0$, the second bit of the received signal RXD is shifted to $Q_{24}$. In this manner, at each timing when the inverted signal RXD is written into the shift register 104 bit by bit, the same bit data of the received signal RXD and the inverted signal RXD are written into the $Q_{24}$ and $Q_0$ bit positions of the shift register 104.

As described above, the data at the bit positions $Q_0$ and $Q_{24}$ of the shift register 104 are applied to the two inputs of the Exclusive OR gate 311. Accordingly, if no error has occurred during the transmission of the received signal RXD and the inverted signal RXD, the output of the Exclusive OR gate 311 must be "1" during the transmission of the inverted signal RXD because the received signal RXD and the inverted signal RXD must be opposite to each other and the inputs to the gate 311 must always mismatch and matching occurs only when an error has occurred during the transmission.

The error detector 308 monitors the signal ERROR during the 24-bit period in which the inverted signal RXD is transmitted and if the signal ERROR is "0", it produces the signal INITIAL. In some transmission error processing systems for such a data transmission system, it has been proposed to correct any detected transmission error to produce correct data. In the present embodiment, if the transmission error is detected, the data reception operation in that frame is cancelled and the system is prepared for the data reception in the next frame. In this manner, the configuration is simplified.

The overall operation of the data transmission in the DIO mode in the embodiment of FIG. 4 is explained with reference to a timing chart of FIG. 8.

The signals $\phi_M$ and $\phi_S$ are the two-phase clock signals supplied from the counter 302 and generated in accordance with the internal clock of the clock generator of the synchronization circuit 301.

The RESET signal is externally supplied to the CIM. It is similar to a reset signal of a microcomputer is supplied for each of the CIMs shown in FIG. 2. It is supplied from an external reset circuit when the power is turned on to initialize the entire transmission system.

After the initialization, the sequence counter 303 has a count "0" is advanced by the clock signal $\phi_M$. No output is produced until the count reaches 25, when it produces an IDLE signal and a RXENA signal so that the CIM assumes an idle status, the sequential control by the count of the sequence counter 303 is stopped and the tri-state buffer 313 is opened to be ready to receive the signal. The signal reception ready state is inhibited until the count of the sequence counter 303 reaches 25 after the initialization because of the step synchronization by the synchronization circuit 301. Since the received signal RXD has 24 bits, the "0" period of at least 25 bits is required.

In the idle status, the sequence counter 303 continues to be advanced by the clock signals $\phi_S$ and $\phi_M$. The sequential decoder 304 continues to generate the control signals IDLE and INITIAL and waits for the input of the received signal. To this end, the 25 "0" bits are inserted at the head of each receiving frame and transmitting frame as shown in FIG. 6.

Assuming that the received signal RXD is inputted at a time $t_0$ in the idle state, the one start bit at the head of the signal RXD is detected by the synchronization circuit 301 to bit-synchronize it with the internal clock. Thus, the subsequent synchronization between the data RXD and RXD and the clock signals $\phi_M$ and $\phi_S$ until one frame of data has been transmitted is maintained by the stability of the internal clock and the step synchronization function is attained.

When the start bit is detected, the sequence counter 303 is reset to "0" (hereinafter the output data of the counter 303 is accompanied with S, e.g. S0 in this case) so that the sequence decoder 304 stops the control signal IDLE and produces the control signal RXMODE. In parallel thereto, the shift pulse SHIFT is supplied to the shift register 104 in synchronism with the clock signal $\phi_M$.

As a result, the 48-bit received signal RXD and inverted signal RXD following the start bit (FIG. 6) are written into the shift register 104 from the transmission line 20 through the composite gate 310 as serial data while the shift register 104 is sequentially shifted one bit at a time. The first 24-bit received signal RXD is inverted by the composite gate 310 to become the data RXD, which is serially written into the shift register 104. Accordingly, for the 24-bit period following the start bit, that is, when the sequence counter 303 reaches S24 from S1, the data corresponding to the inversion RXD of the received signal RXD is written into the shift register 105 at the bit positions $Q_0$–$Q_{23}$. Then, the control signal COMPMODE is generated at the rise of the clock signal $\phi_M$ of the next S25 so that the error detector 308 operates. Then, the inverted signal RXD is inputted and the inversion RXD of the inverted data RXD is serially written into the shift register 105 starting from the bit position $Q_0$. As a result, the data RXD written in the shift register 104 at S1–S24 sequentially overflows from the bit position $Q_{24}$ of the shift register 104 at S25–S48 of the sequence counter 303. In parallel thereto, the inversion RXD of the inverted signal RXD is sequentially and serially written through the bit position $Q_0$ of the shift register 104. During this period, the transmission error is detected by the Exclusive OR gate 311 and the error detector 308, as described above.

Accordingly, when the sequence counter 303 reaches S48, the same data (RXD) as the received data RXD has been written at the bit positions $Q_0$–$Q_{23}$ of the shift register 104. By checking the output signal MYADDR of the comparator at the timing of S48, the address is checked, and it is determined whether the data RXD now received is for that unit or not, that is, whether the call from the CCU is to that unit or not. If a transmission error is detected or an address mismatch is detected during the period of S25–S48 of the sequence counter 303, the error detector 308 produces the control signal INITIAL at the timing of S48 so that the sequence counter 303 is reset to S0 and the reception operation for this frame is cancelled and the system is prepared for the next signal input.

If a transmission error is not detected and an address mismatch is not detected during the period of S25–S48 of the sequence counter 303, that is, if the error detector 308 does not produce the signal INITIAL at the S48 timing, the sequence decoder 304 produces a control signal WRITE STB at the S48 timing. Thus, either the INITIAL signal or the WRITE STB signal is produced at the S48 timing. The former is produced when neither a transmission error nor an address mismatch occurs, and the latter is produced when at least one of the transmission error and the address mismatch occurs.

When the control signal WRITE STB is produced at the S48 timing, the data in the shift register 104 is parallelly written into the I/O buffer 105 so that the data derived from the received data RXD from the CCU is supplied to one of the external loads 51–56 from the output port of the I/O buffer 105. Since the system now operates in the DIO mode, up to 14 bits ($Q_6$–$Q_{19}$) can be transmitted as explained in FIG. 5 and the number of bits used for the output ports of the I/O buffer 105 is determined by the address, as described above.

Thus, at the S48 timing, all processings in the receiving frame are completed and the processing of the transmitting frame is started from S49 (FIG. 6).

No processing is performed between S49 and S72 because of the step synchronization in the CCU. This is similar to the operation in the period prior to the IDLE in the receiving frame processing.

At S73, a control signal PS is produced by the sequence decoder 304 so that the shift register 104 starts to write the parallel data. The parallel data is supplied from one of the external loads 51–56 to the input port of the I/O buffer 105. The number of bits of the data written at this time is equal to 14 (which is the number of port of the I/O buffer 105) less the number of ports used as output ports. As described above, when the CIM address is set to "10", the number of output ports is 10 and the number of input ports is 4.

The parallel data writing to the shift register 104 requires the signal PS as well as one bit of shift clock SHIFT. Thus, after the signal SP has been produced by the clock signal $\phi_S$ at S73, the shift pulse SHIFT synchronized with the clock signal $\phi_S$ at S74 is supplied prior to the rise of the control signal TXMODE.

As is apparent from FIG. 6, it is necessary to add the start bit to the head of the transmission data TXD and insert the address to the first four bits of the data TXD. While not shown in FIG. 4, a signal representing "1" is applied to the bit position $Q_{24}$ of the shift register 104 and the address data from the inputs $2^0$–$2^3$ are supplied to the bit positions $Q_{20}$–$Q_{23}$ only during the period of the signal PS.

After the 25-bit "0" data transmission period which is necessary for the step synchronization has been set by the DUMMY state from S49 to S73, the control signal TXMODE rises at S74 so that the TX (transmission) status is started. The upper AND gate of the composite gate 310 and the AND gate 312 are conditioned by the signal TXMODE. Thus, the data at the bit position $Q_{24}$ of the shift register 104, that is, the start bit "1" is sent out to the transmission line 20 through the AND gate 312. The content of the shift register 104 is shifted backward one bit at a time by the shift clock SHIFT generated in synchronism with the clock signal $\phi_M$ at and subsequent to S75, and it is sent out to the transmission line 20 from the bit position $Q_{24}$ through the AND gate 312 so that the transmission signal TXD including the start bit of the transmitting frame (FIG. 6) is transmitted.

In parallel to the readout of the data from the shift register 104, the data read from the bit position $Q_{23}$ is inverted by the composite gate 310 and the inverted data is supplied to the serial input of the shift register 104 As a result, the transmission data TXD which has been written in the bit positions $Q_0$–$Q_{23}$ of the shift register 104 is sent out to the transmission line 20 bit by bit by the shift clock SHIFT after S75, and it is inverted to the serial data SI, which is sequentially written into the shift register 104 from the bit position $Q_0$.

Accordingly, when all of the transmission data TXD written into the bit positions $Q_0$–$Q_{23}$ of the shift register 104 during the period of the control signal PS has been read out, the inverted data TXD is in the bit positions $Q_0$–$Q_{23}$ in place of the transmission data TXD.

After the readout of the transmission data TXD, the inverted data TXD is read from the shift register 104, and the inverted data TXD is sent out to the transmission line 20, following the transmission data TXD.

At S122, the inverted data at the bit positions $Q_{23}$–$Q_0$ of the shift register 104 has been read out, the control signal TXMODE falls, the supply of the shift clock SHIFT is stopped and the transmission state terminates. The control signal INITIAL is generated by the clock signal $\phi_M$ following to S122 so that the sequence counter 303 is reset to S0 and the CIM returns to the signal reception ready state before the IDLE state.

In accordance with the present embodiment, the step synchronized, bilateral, reversal double transmission, half duplex mode multiplex transmission is attained between the CCU and the LCU and the transmission line wiring is simplified.

The operation of the CIM in the AD mode of the present embodiment will now be explained.

As described above, the electric device which exchanges the data with the CCU through the CIM includes the external loads 57 and 58 (FIG. 2) such as sensors which produce analog signals. Accordingly, the A/D control circuit 106 is included in the embodiment of the present invention to provide the function to control the external A/D 40. This operation mode of the CIM is the AD mode.

As described above, in the present embodiment, the operation mode is set by the address data supplied to the inputs $2^0-2^3$. The address data corresponding to the AD mode are "E" and "F" as shown in FIG. 7.

The data content stored in the shift register 104 when the CIM is set to operate in the AD mode is shown in FIG. 5. The eight bits from No. 0 to No. 7 are used to store the AD data read from the external loads 57 and 58 through the A/D 40, the two bits at No. 8 and No. 9 are used to store the AD channel data, and the ten bits from No. 10 to No. 19 are used to store the DIO data. The other bits are the same as those for the DIO mode. The AD channel data specifies a channel when a multi-channel A/D is used. In the present embodiment, the A/D 40 has four channels and two bits are assigned to the AD channel.

The shift register 320 has eight bits and stores the digital data serially read from the external A/D 40 (A/D converted data of the analog data supplied from the external loads 57 and 58), and parallelly reads the data out. It also parallelly receives the 2-bit channel selection data supplied from the counter 325 to specify the channel of the A/D 40 and serially supplies it to the A/D 40.

The register 321 has 32 bits. Since the A/D 40 has 8 bits and 4 channels, the register 321 also has 8 bits and 4 channels and it stores the 8-bit data read from the A/D 40 for each channel.

The gate 322 also has 32 bits (8 bits, 4 channel) to correspond to the register 321 and it is controlled by the AD channel data (FIG. 5) read from the bit positions $Q_8$ and $Q_9$ of the data transmitting shift register 104 to select one of the channels of the register 321 and write the 8-bit data into the bit positions $Q_0-Q_7$ of the shift register as the AD data (FIG. 5).

The counter 323 is advanced by the count of the clock signal $\phi_M$ and cyclically and sequentially controls the operation of the A/D control circuit 106.

The A/D control signal generator 324 includes a decoder for decoding the output of the counter 323 and a logic circuit, and generates control signals necessary to the operation of the A/D control circuit 106.

The overall operation of the A/D control circuit 106 is now explained.

In the present embodiment, the sequential control is effected by the count output of the counter 323. The number of steps is 27, that is, one cycle of control is completed by the count output 0 (S0) to the count output 26 (S26), during which one channel of data of the A/D 40 is read into the register 321.

When one cycle of control is started, the channel selection counter 325 is incremented by the signal INC so that the output data of the counter 325 sequentially changes from (0,0) to (0,1), (1,0), (1,1), and (0,0) for each cycle.

The output data of the counter 325 is parallelly written into the first two bit positions of the shift register 320, and then read out as the serial data ADSI and supplied to the A/D 40.

In parallel thereto, the output data of the counter 325 is supplied to the register 321 through a decoder (not shown) so that the 8 bits in the channel corresponding to the register 321 is selected.

Then, the A/D 40 selects the analog input channel corresponding to the channel selection data supplied as the serial data ADSI, converts the analog data to digital data, supplies it to the serial input of the shift register 320 as the 8-bit serial data ADSO, and stores it in the shift register 320.

Then, the 8-bit digital data AD stored in the shift register 320 is parallelly read out at a predetermined timing and transferred to the 8 bit positions of the channel of the register 321 determined by the output data of the counter 325. Thus, one cycle of control operation terminates.

Assuming that the output data of the counter 325 is (0,0), the analog data in the channel 0 of the A/D 40 is digitized and it is stored in the 8 bit positions of the channel 0 of the register 321. Then, the counter 323 is reset to S0 and the next cycle is started. The counter 325 is incremented to produce the output data (0,1) so that the analog data in the channel 1 is digitized and it is stored in the 8 bit positions of the channel 1 of the register 321.

Accordingly, in the present embodiment, the reading operation of the data from the A/D 40 by the A/D control circuit 106 is effected at independent timing from the data transmission by the sequence counter 303 and the sequence decoder 304. The data in the respective channels of the register 321 are refreshed once for every four cycles of the AD control so that the analog data supplied to the four channels of the A/D 40 are always prepared in the register 321 as the 8-bit digital data for each channel.

Let us assume that the received signal RXD is supplied from the transmission line and the address data attached thereto addresses the present CIM. The address data in this case is "E" or "F" as described above.

The format of the data written into the shift register 104 at the end of the input of the receiving frame (S48 in FIG. 8) is the AD mode of FIG. 5. Accordingly, the 2-bit AD channel data is at the bit positions $Q_8$ and $Q_9$ of the shift register 104. The AD channel data is read at S48 when the signal WRITE STB is generated so that one of four channels of the gate 322 is selected.

As a result, only the AD data of that channel of the four channels of the register 321 which is selected by the two bits $Q_8$ and $Q_9$ of the shift register 104 is read out at S73 (FIG. 8) when the signals PS and SHIFT are generated, and it is written into the eight bit positions $Q_0-Q_7$ of the shift register 104.

It is included in the transmission signal TXD in the transmission status after S74 and transmitted to the CCU.

In the present embodiment, the AD data is always prepared in the register 321 independently from the reception operation of the received signal RXD and the subsequent transmission operation of the transmission signal TX, as described above.

Accordingly, in the present embodiment, at whatever timing the received signal RXD to that unit appears, the transmission signal TXD can be immediately transmitted by the AD data, and the transmission operation is not affected by the operation of the A/D 40 and the transmission rate is not lowered by the A/D conversion time.

In the present embodiment, the A/D 40 located off the LSI chip of the CIM to reduce a cost of the CIM. As explained in FIG. 2, one type of CIM may be used as the LCU 30, 31 or 32 or the CIM 33 of the CCU 10 by setting the mode. If the A/D is included in the chip, it is wasteful when it is used as the CIM 30, 31 or 33. Since the number of CIMs 32 is smaller than the number of CIMs 30, 31 and 33 used in the compact wiring system for the automobile, it is not advantageous to include the A/D in all CIMs. For this reason, the A/D located off the chip.

Because of the location of the A/D off of the chip, four connecting terminals are required for the external A/D 40 and the number of pins of the LSI increases.

In one embodiment of the present invention, four of fourteen ports of the I/O buffer 105 are selected as the connecting terminals to the A/D 40 when the CIM is set in the AD mode. In the embodiment, the I/O buffer 105 has fourteen ports all of which may be used as input/output ports when the CIM is set in the DIO mode, but in the AD mode, up to ten ports are used and the four ports are not used as DIO data input/output ports. Accordingly, the four non-used ports are selected in the AD mode to use them as the terminal pins for the A/D 40. Thus, the number of pins is not increased by the external A/D and the cost of the LSI is reduced.

The operation in the MPU mode of the CIM in the present embodiment will now be explained.

As seen from FIG. 7, in order to set the CIM to the MPU mode, the addresses ADDR0–ADDR3 are set to "0" that is, all inputs $2^0$–$2^3$ are maintained at the ground potential (0000).

The MPU mode imparts the functions necessary to the CIM 33 of FIG. 2. Unlike the DIO mode and the AD mode, the MPU mode effects the transmission interface in which when the data is supplied from the microcomputer of the CCU 10, it is transmitted to one of the CIMs 30–31 of the predetermined LCU, and when the data transmitted back in response thereto is received, the data is transferred to the microcomputer.

Heretofore, the explanation was made as viewed mainly from the CIM of the LCU as shown in FIG. 6 and hence the frame for transmitting the data from the CIM of the CCU to the CIM of the LCU was referred to as the receiving frame, and the frame for transmitting the data from the LCU to the CCU was referred to as the transmitting frame. Hereinafter, the frame for sending out the data as viewed from each CIM is referred to as the transmitting frame, and the frame for receiving the data as viewed from each CIM is referred to as the receiving frame. Accordingly, the transmitting frame in the CIM 33, for example, is the receiving frame in the CIM 30, and the transmitting frame in the CIM 30 is the receiving frame in the CIM 33.

Figure 9:
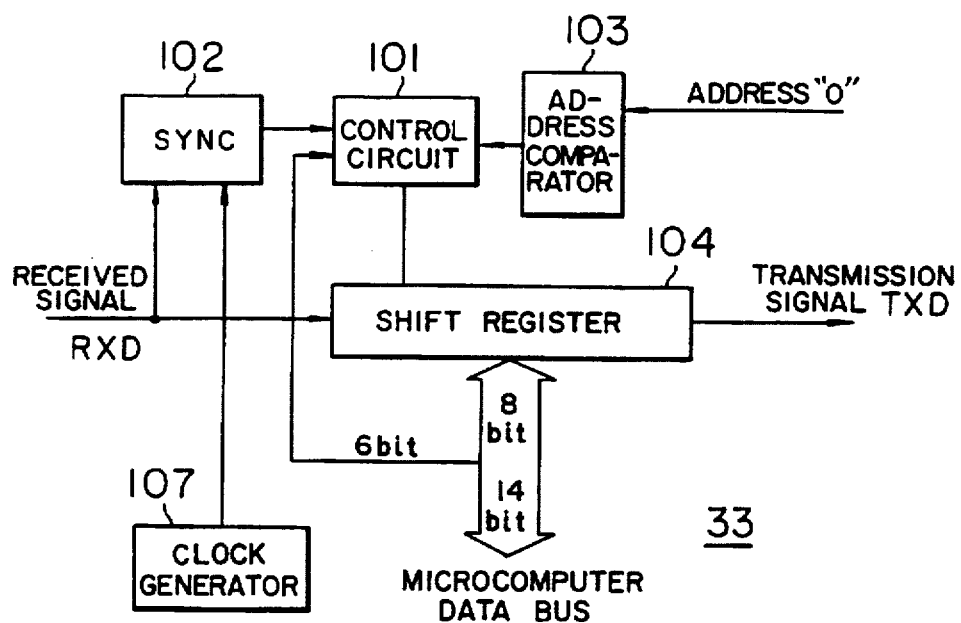
FIG. 9 is a functional block diagram of the embodiment of the local control unit in a CPU mode.

FIG. 9 shows a functional block diagram when the address "0" is set to the CIM of the present embodiment so that it is controlled to operate in the CPU mode. It represents the status of the CIM 33 in FIG. 2. As explained before, in the present embodiment, one type of CIM can perform the function of any of the three modes, CPU mode, DIO mode and AD mode by setting the address. Accordingly, FIG. 9 shows the functional block in the CPU mode and it does not show that the configuration of the CIM in the present embodiment is different from that of FIG. 3.

As seen from FIG. 9, the functions of the I/O buffer 105 (FIG. 3) and the A/D 40 are omitted and the CIM is connected to the microcomputer through the 14-bit data bus in the CPU mode. The terminal pins therefor are shared with the input/output ports of the I/O buffer 105 so that the number of terminal pins does not change.

Eight of fourteen input/output ports are used for the data and the remaining six ports are used for the control signal.

In the CPU mode, the data content of the shift register 104, that is, all of the 24 bits $Q_0$–$Q_{23}$ are MPU data, and the microcomputer accesses the shift register 104 through the 8-bit data bus.

Figure 10:
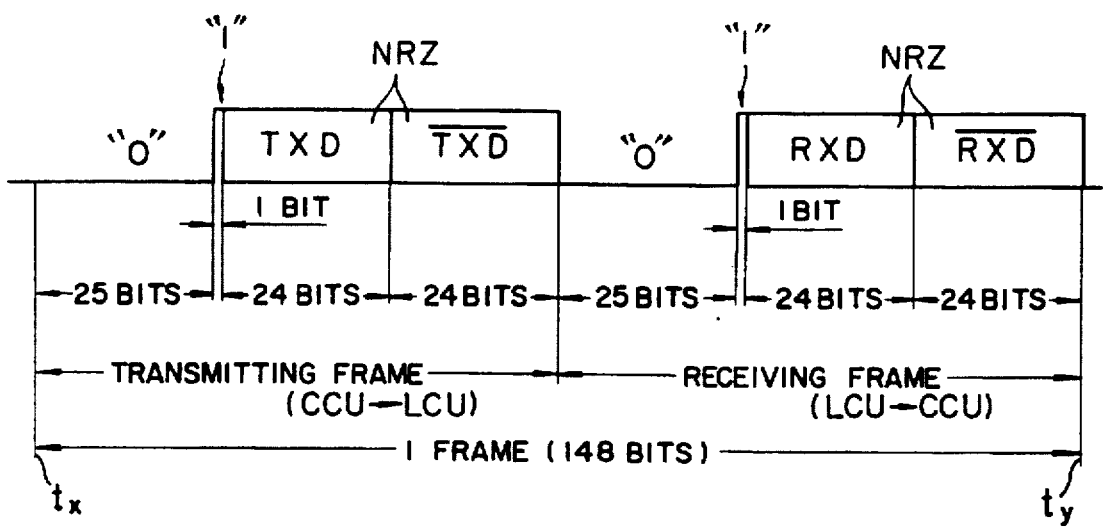
FIG. 10 shows an example of the transmission waveform in the CPU mode.

The control circuit 101 receives the control signal from the microcomputer and starts the transmission operation when the data from the microcomputer is stored in the bit positions $Q_0$–$Q_{23}$ of the shift register 104, and starts the transmission of the transmitting frame from the time $t_x$ when the data has been stored, as shown in FIG. 10.

As the transmitting frame is transmitted from the CIM 33, one of the CIMs 30–32 of the LCU responds thereto to start the transmission. Thus, at a time $t_y$ when one frame (148 bits) of transmission time has elapsed from the time $t_x$, the data transmitted from the CIM (one of the CIMs 30–32) called by the CIM 33 has been stored in the shift register 104.

The control circuit 101 of the CIM 33 generates an interrupt request IRQ at the time $t_y$ and the microcomputer responds thereto to read the data of the shift register 104. Thus, the one cycle of data transmission terminates. The data exchange among the CIMs is the same as that in the DIO mode explained in FIG. 3.

Figure 11:
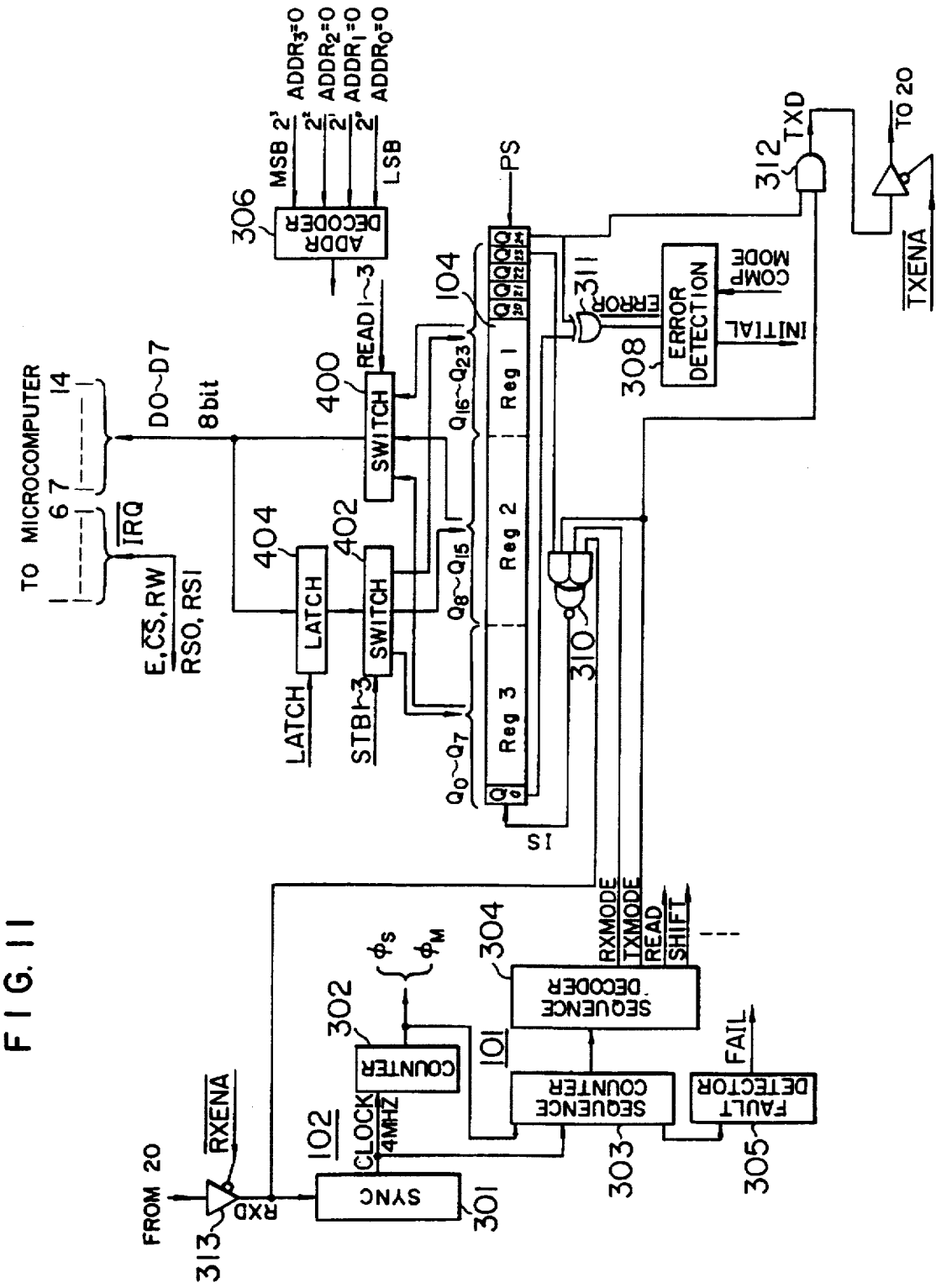
FIG. 11 is a functional block diagram showing a detail of the embodiment of FIG. 9.

FIG. 11 shows a functional block diagram of the CIM 33 or one embodiment of the CIM set in the MPU mode. It only shows the blocks corresponding to the functions necessary in the MPU mode. Numerals 400 and 402 denote 8-bit switches and numeral 404 denotes an 8-bit data latch. Other blocks are identical to those in the embodiment of FIG. 4.

In the MPU mode, the bit positions $Q_0$–$Q_{23}$ of the shift register 104 are connected to the data bus of the microcomputer through the 8-bit input/output pins to mutually exchange the data. The bit positions $Q_0$–$Q_{23}$ of the shift register 104 are divided into three groups $Q_0$–$Q_7$ (Reg 3), $Q_8$–$Q_{15}$ (Reg 2) and $Q_{16}$–$Q_{23}$ (Reg 1), which are sequentially accessed in a time division fashion.

To this end, the 8-bit switches 400 and 402 are provided, and control signals READ1–3 for the switch 400 and control signals STB1–3 for the switch 402 are prepared by a combination of the register select signals RS0 and RS1 supplied from the microcomputer so that the I/O terminal pins 7–14 are sequentially connected to Reg 1, Reg 2 and Reg 3 and the data is exchanged between the microcomputer and the shift register 104 through three sequential accesses, eight bits at a time. When the data is written from the microcomputer to the shift register 104, the difference between the read time of the data from the microcomputer and the write time of the data to the shift register 104 is compensated by the latch 404, to which the data from the microcomputer is temporarily latched.

In the MPU mode, the address attached to the head of the 24-bit data in the data reception mode is not compared in the CIM 33. Accordingly, the address (0000) supplied to the inputs $2^0$–$2^3$ is used by the address decoder 306 only for setting the CIM to the MPU mode, and the comparator 307 in FIG. 4 is not operated.

In the MPU mode, the I/O terminal pins 1–6 of the CIM 33 are used as the transmission line of the control signal to the microcomputer. The microcomputer supplies the clock E, chip select signal CS, read/write signal RW and register select signals RS0 and RS1 to the control circuit 101 of the CIM, and the CIM supplies the interrupt request signal IRQ to the microcomputer.

Figure 12:
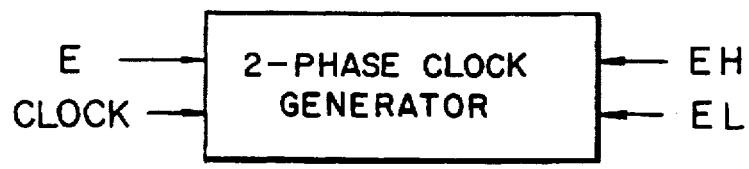
FIGS. 12 and 13 are block diagrams of embodiments of a signal processing circuit.
Figure 13:
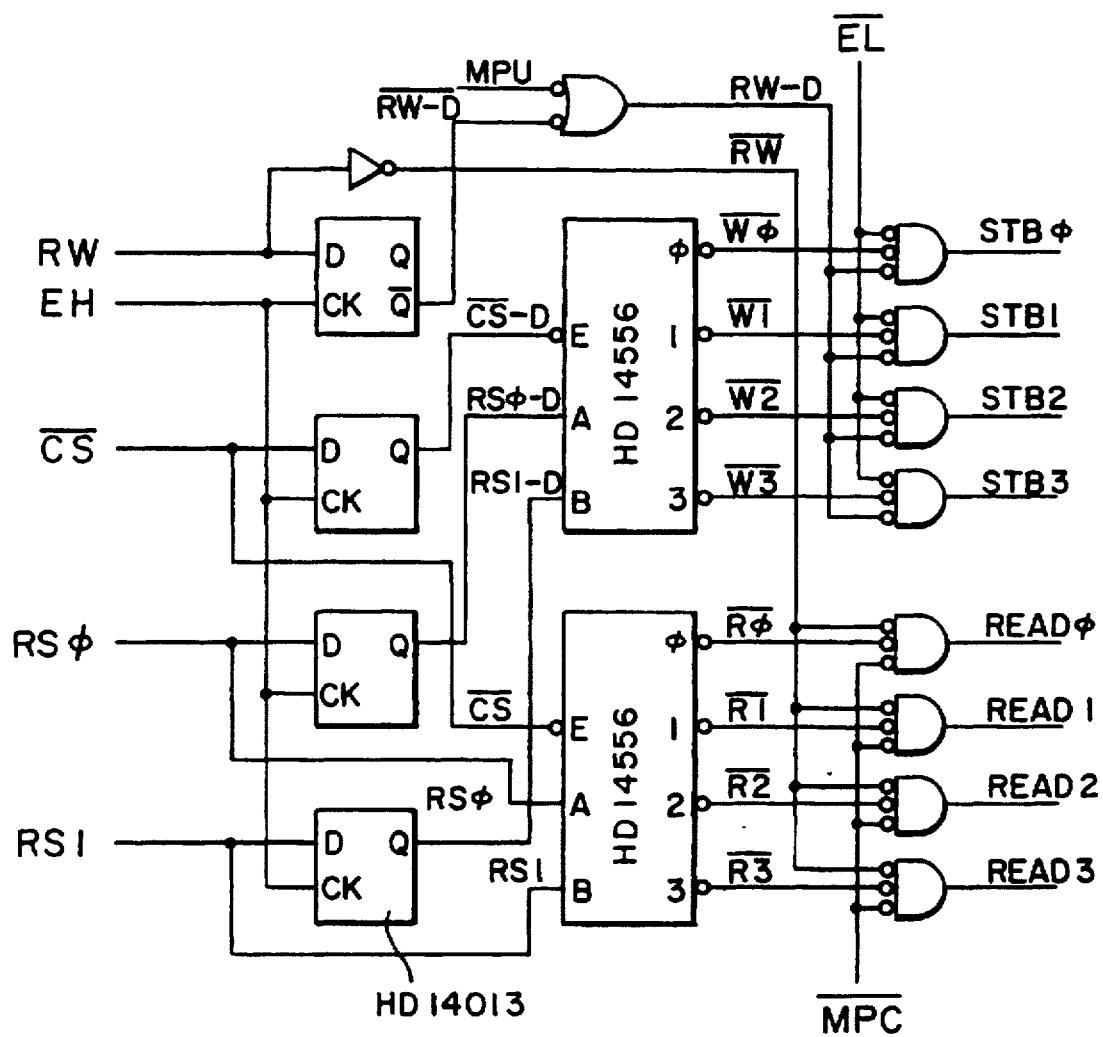

FIGS. 12 and 13 show one embodiment of the signal processing circuit. It is included in the control circuit 101 although it is not shown in FIG. 11. The clock signal E is supplied to the circuit of FIG. 12 and processed together with the internal clock signal CLOCK so that two-phase clock signals EH and EL are generated. The clock signals EH and EL and the signals RW, CS, RS0 and RS1 from the microcomputer are processed by the circuit of FIG. 13 and signals STB 0–3 and READ 0–1 are generated. The signal MPU is "1" when the CIM is set to the MPU mode. The signal processing timings of the circuit of FIG. 13 are shown in FIGS. 14 and 15. FIG. 14 shows the generation timing of the signals READ 0–3 and FIG. 15 shows the generation timing of the signals STB 0–3. In those figures, the generation of one of the signals READ 0–3 and the generation of one of the signals STB 0–3 are determined by the combination of the signals RS0 and RS1 and one of the groups Reg. 1, Reg. 2 and Reg. 3 of the shift register 104 is selected accordingly.

Of those signals READ 0–3 and STB 0–3, the signals READ 0 and STB 0 are not used for the group selection of the shift register 104 but are used to generate the interrupt request signal IRQ.

The selection by the signals RS0 and RS1 is illustrated in FIG. 16.

Figure 17:
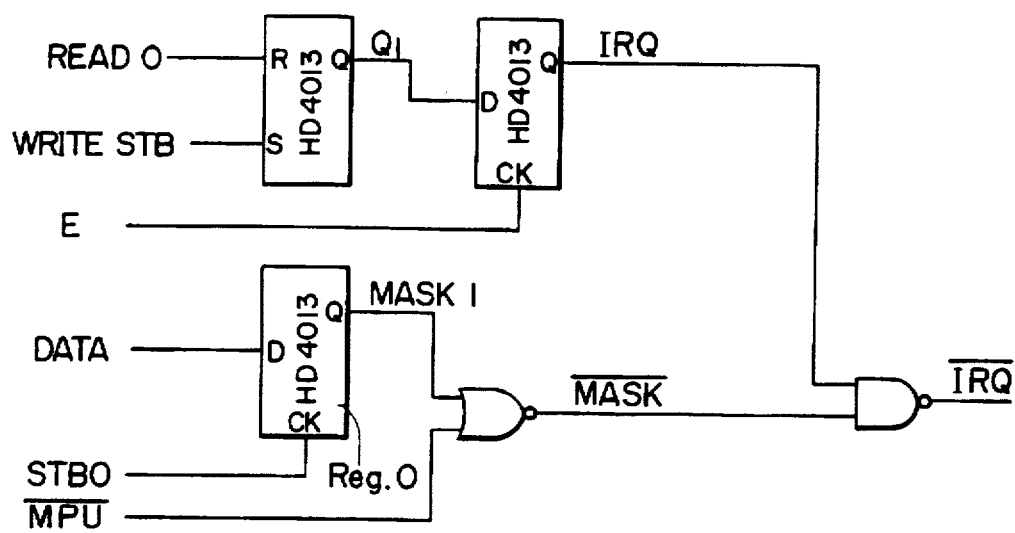
FIG. 17 is a block diagram of one embodiment of an interrupt request signal generating circuit.
Figures 18, 19:
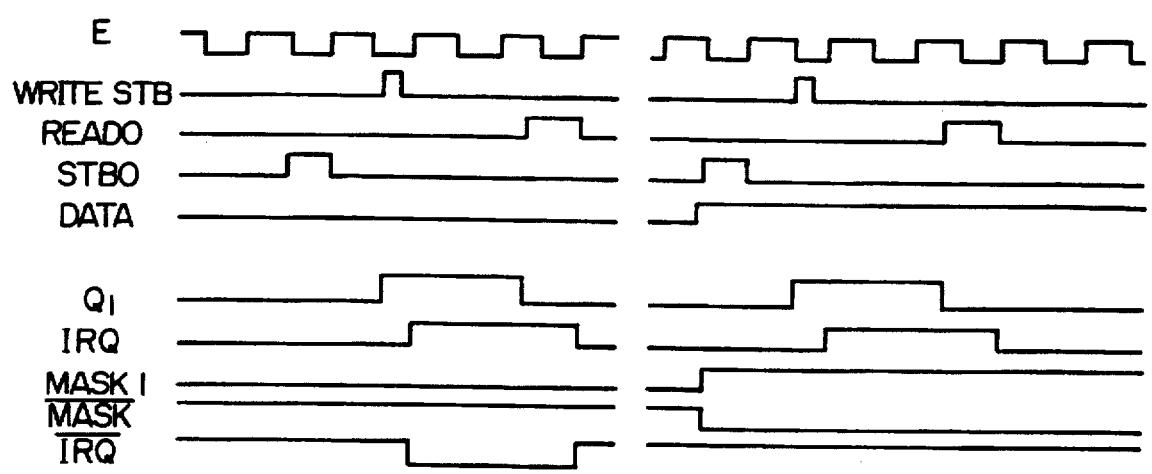
FIGS. 18 and 19 are timing charts for explaining the operations of FIG. 17.

FIG. 17 shows one embodiment of a generation circuit for the interrupt request signal IRQ. It is also included in the control circuit 101 of FIG. 11 and comprises a circuit for generating the signal IRQ by the signal WRITE STB (FIG. 8) and the signal READ 0 generated when the CIM 33 completes the reception of the data and the storing of the received data in the shift register 104, and a circuit for generating a signal MASK 1 from the signal DATA from one of the data lines D0–D7 connected to the data bus of the microcomputer through the I/O terminal pins 7–14, and the signal STB 0. The operation is shown in the timing charts of FIGS. 18 and 19. FIG. 18 shows the operation when the signal DATA is "0" at the timing of the occurrence of STB 0, and FIG. 19 shows the operation when the signal DATA is "1". In FIG. 17, a flip-flop to which the signals DATA and STB 0 are supplied is referred to as Reg. 0. Thus, in the circuit of FIG. 17, if "1" is written into the Reg. 0, the interrupt request signal IRQ is masked.

The overall operation of the data transmission in the MPU mode of the present embodiment is explained with reference to FIG. 20.

In the present embodiment, the operations of the CIMs 30–33 are controlled by the count output of the sequence counter 303 and any operation can be selected by setting the count output of the sequence counter 303 to a predetermined value, as explained above in FIGS. 4 and 8. This is equally applicable to any mode of the CIM.

As shown in FIG. 11, the CIM which is coupled to the CIM 33 set in the MPU mode for the data transmission is the CIM 30–32 which is set in the DIO mode or the AD mode, as seen from FIG. 2. When this CIM is set in the DIO mode or the AD mode, it transmits data following the reception of the data from the other CIM 33 to effect the one frame of data exchange as explained in FIG. 8. Thus, it carries out only a passive operation.

On the other hand, the CIM 33 set in the MPU mode starts the data transmission when the data is written into the shift register 104 from the microcomputer. That is, it carries out an active operation.

In the present embodiment, the signal STB3 of the group selection signals STB1–3 of the shift register 104 is used to start the active data transmission. The transmission data is written into the shift register 104 by the microcomputer in the sequence of Reg. 1, Reg. 2 and Reg. 3, and when the signal STB3 is generated the writing of the data from the microcomputer to the shift register 104 has just been completed and the data to be transmitted has been stored in the shift register 104.

Turning back to FIG. 20, let us assume that the data to be transmitted to one of the LCUs has been prepared in the microcomputer of the CCU 10 (FIG. 2) at a certain time point.

The microcomputer supplies the signals CS, RW, RS0 and RS1 to the control circuit 101 of the CIM 33 through the I/O terminal pins 1–6, generates the signal STB0 as explained in FIGS. 12–16 (top left end in FIG. 20) and writes the data from the data bus into the Reg. 1, Reg. 2 and Reg. 3 of the shift register 104, eight bits at a time.

Figure 21:
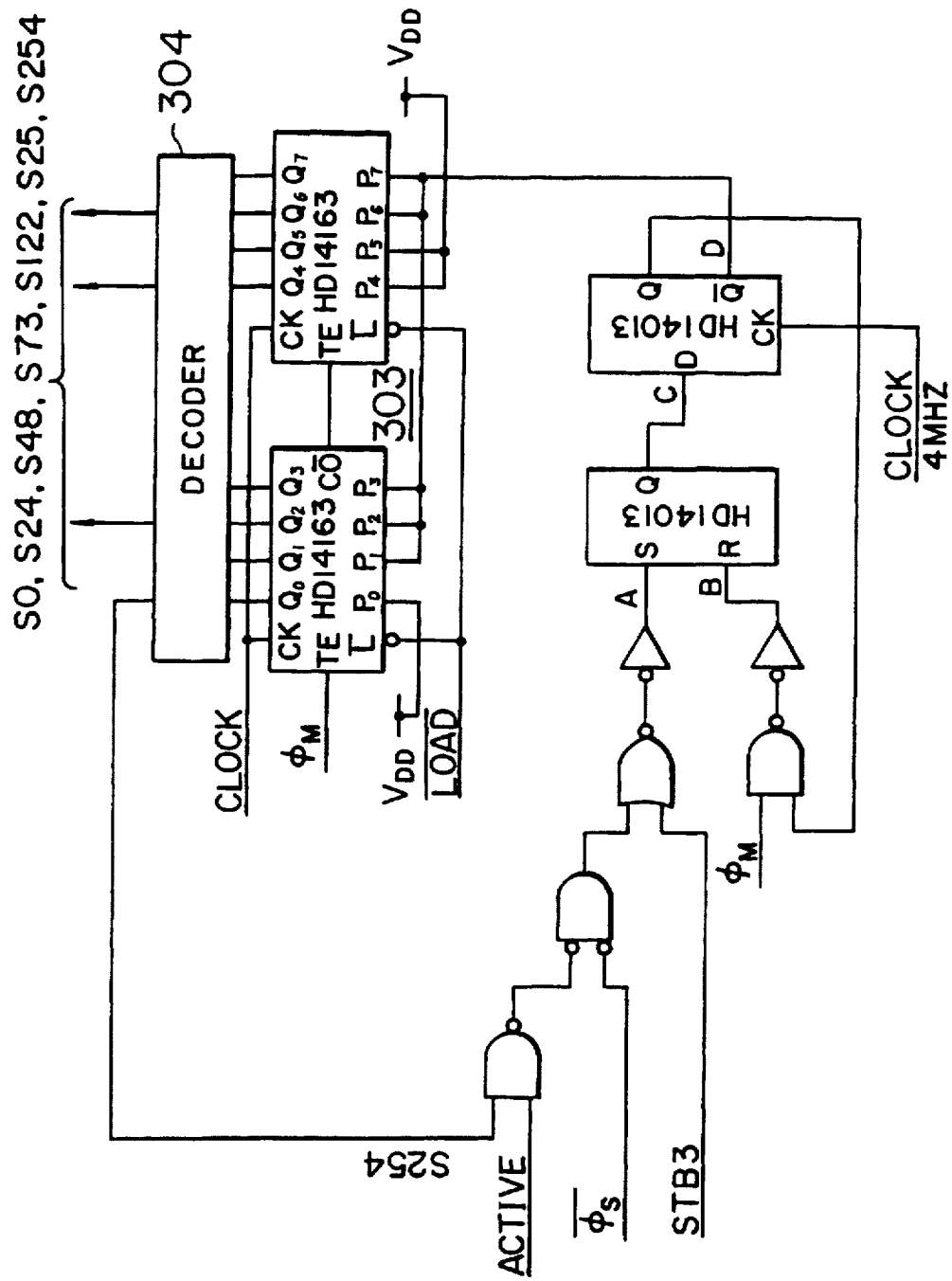
FIG. 21 is a block diagram of an embodiment of a counter setting circuit.
Figure 22:
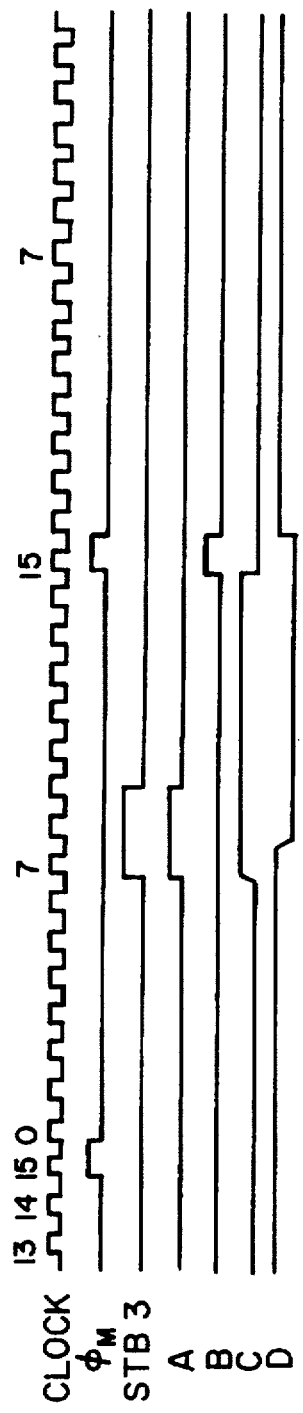
FIG. 22 is a timing chart for explaining an operation of FIG. 21.

On the other hand, the control circuit 101 detects the generation of the signal STB3 and loads "49" into the sequence counter 303. An embodiment of the circuit for setting the output data of the sequence counter 303 to "49" by the signal STB3 is shown in FIG. 21 and the timing chart for the operation of the circuit is shown in FIG. 22.

When the sequence counter 303 is set to S49, the processing of the transmitting frame is started at $t_x$ (FIG. 10). The processing of the transmitting frame at S49–S122 is essentially identical to that in the DIO mode. In the MPU mode, however, since the data to be transmitted has been written into the shift register 104, nothing occurs between S49 and S73 except that the start bit "1" is written into the bit position $Q_{24}$ of the shift register 104, as distinguished from the operation in the DIO mode.

At S122, the signal INITIAL is generated and the idling state including the minimum time from S0 to S24 is started. In the MPU mode, unlike in the DIO mode, the reception of the data from another CIM is not waited for but the data "49" is forcibly loaded into the sequence counter 303 when the data from the microcomputer has been written into the shift register 104 so that the processing of the transmission frame is automatically started.

As the transmitting frame is transmitted from the CIM 33 of the CCU 10, the transmission data TXD is received and processed by the CIM 30–32 of the LCU as the received data RXD and other data is transmitted back from the CIM having the matching address and it is received by the CIM 33 as the received data RXD.

Figure 8:
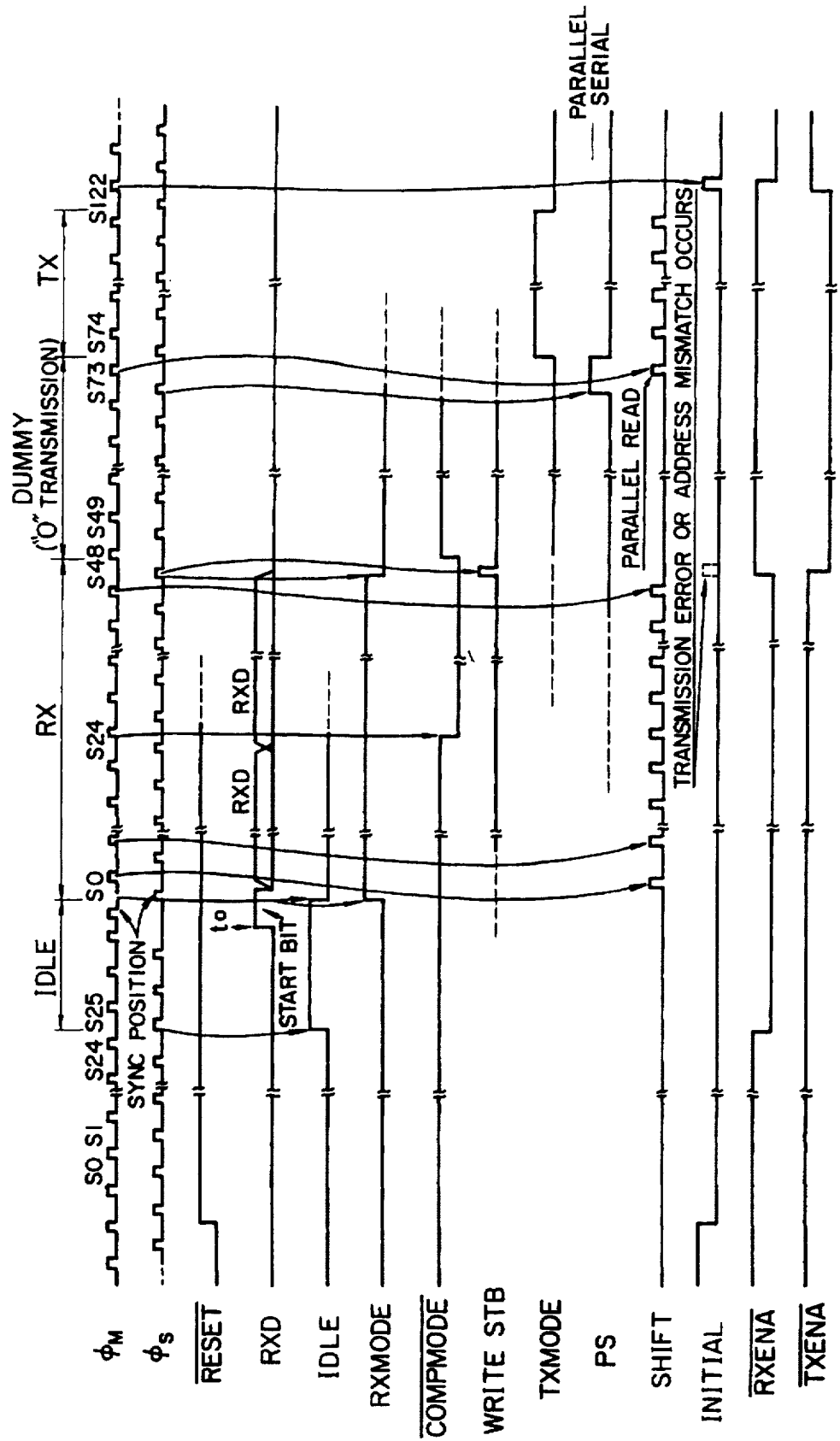
FIG. 8 is a timing chart for explaining an operation of the embodiment of the present invention in a DIO mode.

The processing of the receiving frame is essentially identical to that in the DIO mode in FIG. 8 except that the address matching is not checked in the MPU mode. The received data is stored in the shift register 104 at S0–S48, and if no error is detected, the interrupt request signal IRQ is generated at the rise of the signal WRITE STB at the clock signal $\phi_S$ of S48 as explained in FIG. 17–19, and the signal INITIAL is generated by the subsequent clock signal $\phi_M$ so that the CIM 33 enters the idle state and is kept in the idle state until the next signal STB3 is generated.

As the interrupt request signal IRQ is generated, the microcomputer in the CCU 10 responds thereto to jump to an interruption processing routine to read in the received data from the shift register 104. The data from the shift register 104 is read by using the switch 400 and sequentially supplying the signals READ1–3 from the circuit shown in FIGS. 12 and 13, in the sequence of-the Reg. 1, Reg. 2 and Reg. 3 of the shift register 104 through the 8-bit data bus D0–D7, as explained above.

In the present embodiment, as explained in FIG. 17, the signal IRQ can be masked. By writing "1" into the Reg. 0 (FIG. 17), the microcomputer of the CCU 10 can mask the signal IRQ.

Accordingly, by setting the data bus D0 to "1" at the timing of the occurrence of the signal STBO (left bottom in FIG. 20) prior to the timing $t_x$ of the occurrence of the signal STB3, the signal MASK is "1" and the interrupt request signal IRQ is not supplied to the microcomputer when the signal WRITE STB is subsequently generated. Thus, the microcomputer can execute other processing preferentially for a predetermined period as required. To release the masking, the data bus D0 is set to "0" and "0" is written into the Reg. 0 when the signal STBO is generated, as seen from FIG. 17.

When the signal IRQ is masked, the microcomputer of the CCU 10 checks the signal IRQ of FIG. 17, and if it is "1" indicating that the reception of the data has been completed, it reads in the data from the shift register 104. If the signal IRQ is "0", it waits for the completion of the data reception. The signal IRQ is released by the signal READ 0 generated when the data is read in, as seen from FIG. 17.

In the present embodiment, the microcomputer of the CCU can start other processing after the data has been transferred to the CIM 33. Accordingly, wasteful waiting time is eliminated and the performance of the system is enhanced. Even if the data reception by the CIM 33 is completed, the higher priority processing may be masked so that the higher priority processing is not interrupted.

Figure 23:
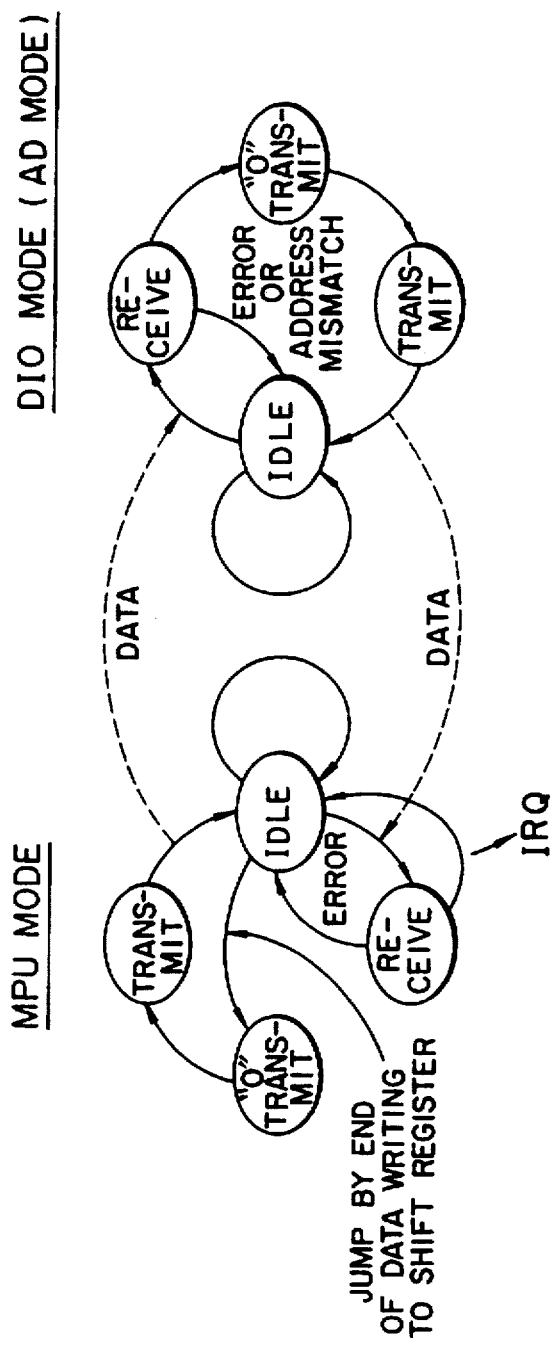
FIG. 23 is a status transition chart of a data transmission operation by a combination of the CPU mode and the DIO mode.

A status transition of the data transmission by the combination of the CIM 33 set in the MPU mode and the CIMs 30–32 set in the DIO mode (or AD mode) is shown in FIG. 23.

The transmission control by the microcomputer of the CCU 10 will now be explained.

The microcomputer of the CCU reads in the data from the switches and the sensors of the loads of the LCUs and sends out the data to control the lamps and the actuators of the loads to the respective LCUs. It also will initialize the transmission system when it is powered up and monitors the operations of the CIMs of the LCUs when the data transmission is in the steady state.

Figure 24:
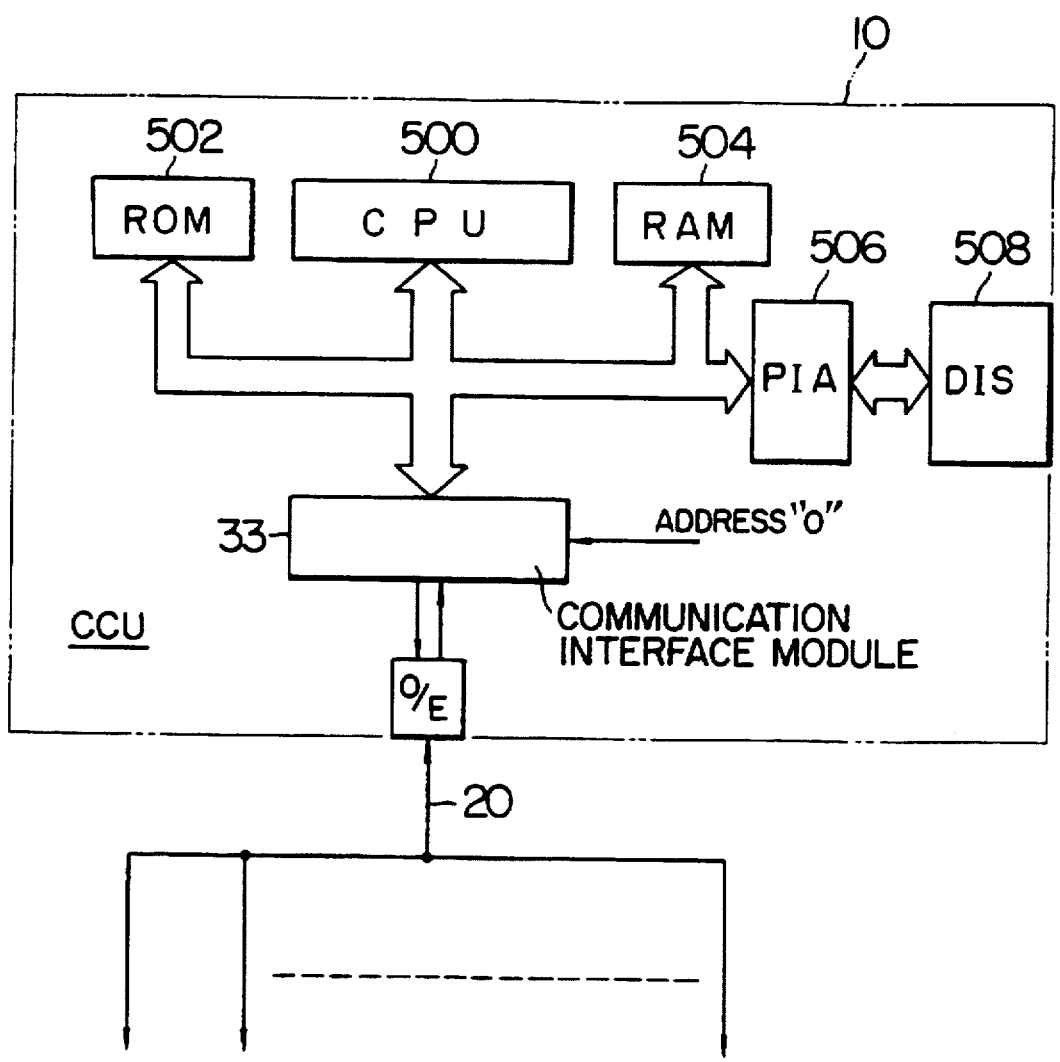
FIG. 24 is a block diagram of an embodiment of a central control unit.

FIG. 24 shows one embodiment of the CCU 10. Numeral 500 denotes a central processing unit (CPU), numeral 502 denotes a read-only memory (ROM) for storing a program, numeral 504 denotes a random access memory (RAM) for storing the data, numeral 506 denotes a peripheral interface adapter (PIA) and numeral 508 denotes a display (DIS). The CIM 33 set in the CPU mode, the opto-electric conversion module O/E and the bilateral transmission line 20 comprising the optical fiber cable OF have been explained in FIGS. 1 and 2.

The operation of the embodiment of FIG. 24 is explained with reference to a flow chart of FIG. 25.

When the power to the data transmission system is turned on by turning on an engine key switch of the automobile and the transmission operation is started, the processing shown in the flow chart is started from a first step S1.

In the step S1, a system start flag is set.

In a step S2, it is checked to see if the data transmission from the CCU to the respective LCUs has cycled after the system start, and if the check result is NO, that is, if there remains a LCU to which the data has not yet been transmitted from the CCU or which has not yet been called by the CCU after the system start, the program goes to a step S3, and otherwise goes to a step S9.

In the step S3, it is checked to see if the data was transmitted from the CCU at least once after the system start to determine if it is a first transmission or not. If the decision is YES, the program goes to a step S4, and if NO, the program goes to a step S10.

In the step S4, a specified control data stored in the ROM 502 is transmitted to a specified LCU. The specified control data is such that a control status of the load of the specified LCU complies with the data at the system start. For example, when the load of the LCU is a lamp, the control data causes the lamp to be turned off, and when the load is an actuator such as a wiper motor, the control data causes the wiping operation to be stopped, after the step S4, the program goes to a step S5.

In the step S5, it is checked to see if the data has been transmitted from one of the LCUs, and if the decision is NO, the program goes to a step S6, and if the decision is YES, the program jumps to a step S8. Since the data transmitted from the LCU to the CCU represents the operation status of the switches and the sensors of the loads connected to the LCU, it is called monitor data.

In the step S6, it is checked to see if the decision in the step S5 is NO twice continuously, and if the decision is YES, the program goes to a step S7, and if the decision is NO, the program returns to the step S3.

In the step S7, an alarm is issued to display on the DIS 508 that an error such as a fault has occurred in the LCU which did not transmit the data twice continuously. Then, the program goes to a step S8.

In the step S8, the next LCU to which the data is to be transmitted from the CCU is determined. To this end, the LCU to which the data is to be first transmitted from the CCU is assigned with No. 1 and the other LCUs are assigned with the following numbers so that they are sequentially selected. After the step S8, the program returns to the step S2.

If the decision in the step S2 is YES, the program goes to the step S9. After the step S9 or when the decision in the step S3 is NO, the program goes to the step S10. In the step S9, the system start flag is cleared.

In the step S10, the control data for the respective LCUs prepared based on the monitor data received from the respective LCUs are transmitted to the corresponding LCUs. The transmission operations in the step S4 and the step S10 are automatically started after the writing of the 24-bit data to the shift register 104 of the CIM 33 from the CPU 500 of the microcomputer is completed and when the signal STB is generated, as described above.

Figure 20:
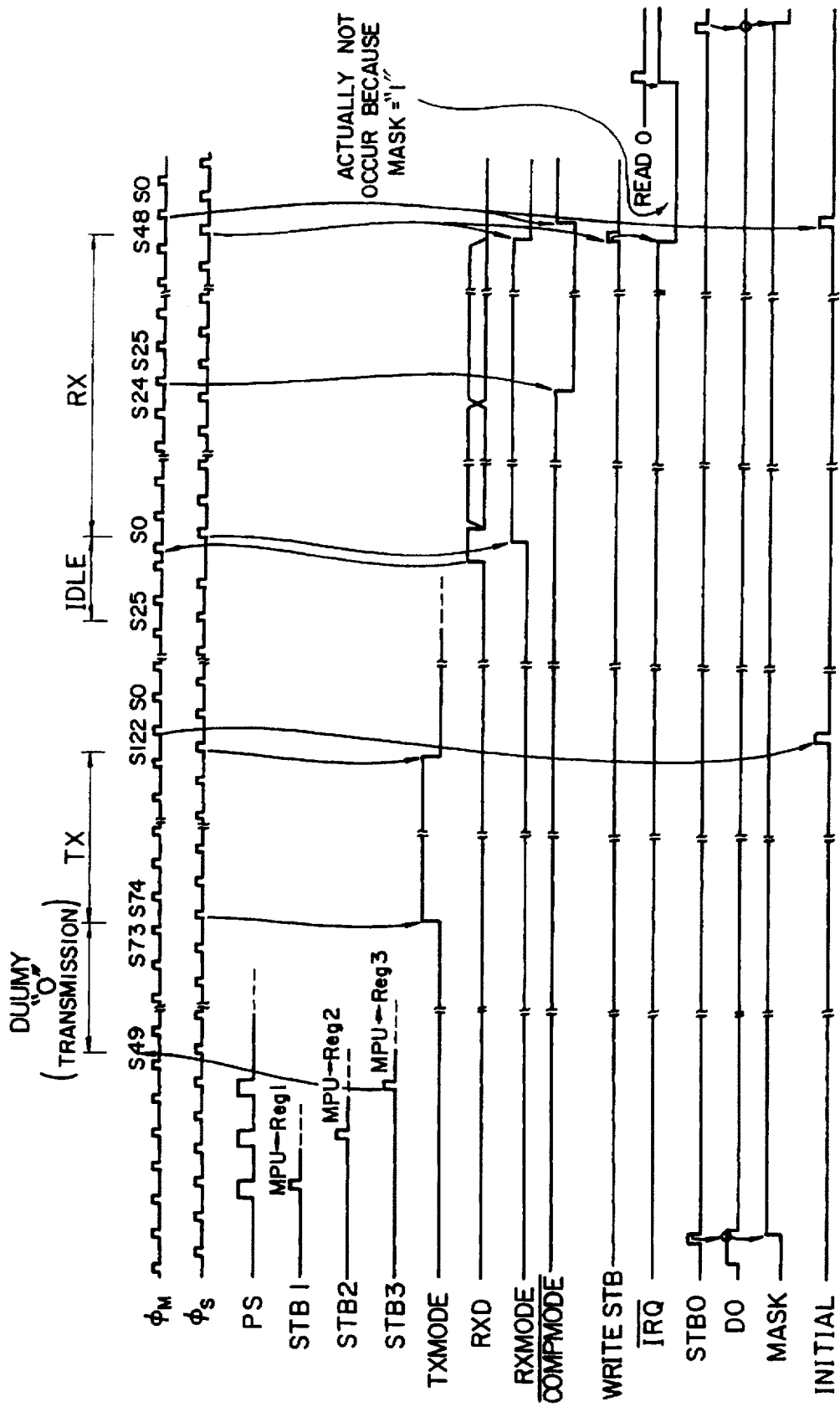
FIG. 20 is a timing chart for explaining an operation in the CPU mode.

When the CIM 33 receives the data while the microcomputer including the CPU 500 operates in accordance with the steps S1–S10, the interrupt request IRQ is generated and the program of the microcomputer jumps to the interrupt routine to read in the data from the CIM 33, as explained in FIG. 20. As shown in FIG. 26, the control data is newly prepared during the interrupt processing based on the monitor data received from the LCU through the CIM, and necessary ones of the monitor data are displayed on the DIS 508. The data prepared in the interrupt processing are transmitted to the corresponding LCUs in the step S10 of FIG. 25. When the interrupt request IRQ is masked, the operation corresponding to that when the mask is released is carried out as explained above.

The result of the processing of FIGS. 25 and 26 will now be explained.

Because of the steps S2, S3 and S4, the first data transmission after the power-on is the transmission of the specified data to the specified LCU.

As a result, the load in the specified LCU is immediately set to a controlled status by the specified data from an abnormal control status by undefined data at the power-on.

On the other hand, if at least one monitor data is received after the power-on, the control data can be prepared based on the monitor data. Accordingly, fairly reasonable control data is thereafter transmitted to the LCUs other than the specified LCU by the data transmission in the step S10. This is more enhanced as the number of times of data transmission increases. As the number of times of data transmission approaches the number of LCUs, a substantially perfect control status which is very close to a steady state is attained.

Accordingly, in accordance with the present embodiment, the abnormal control state of the load at the time of power-on is minimized and a practically acceptable control is attained.

Figure 25:
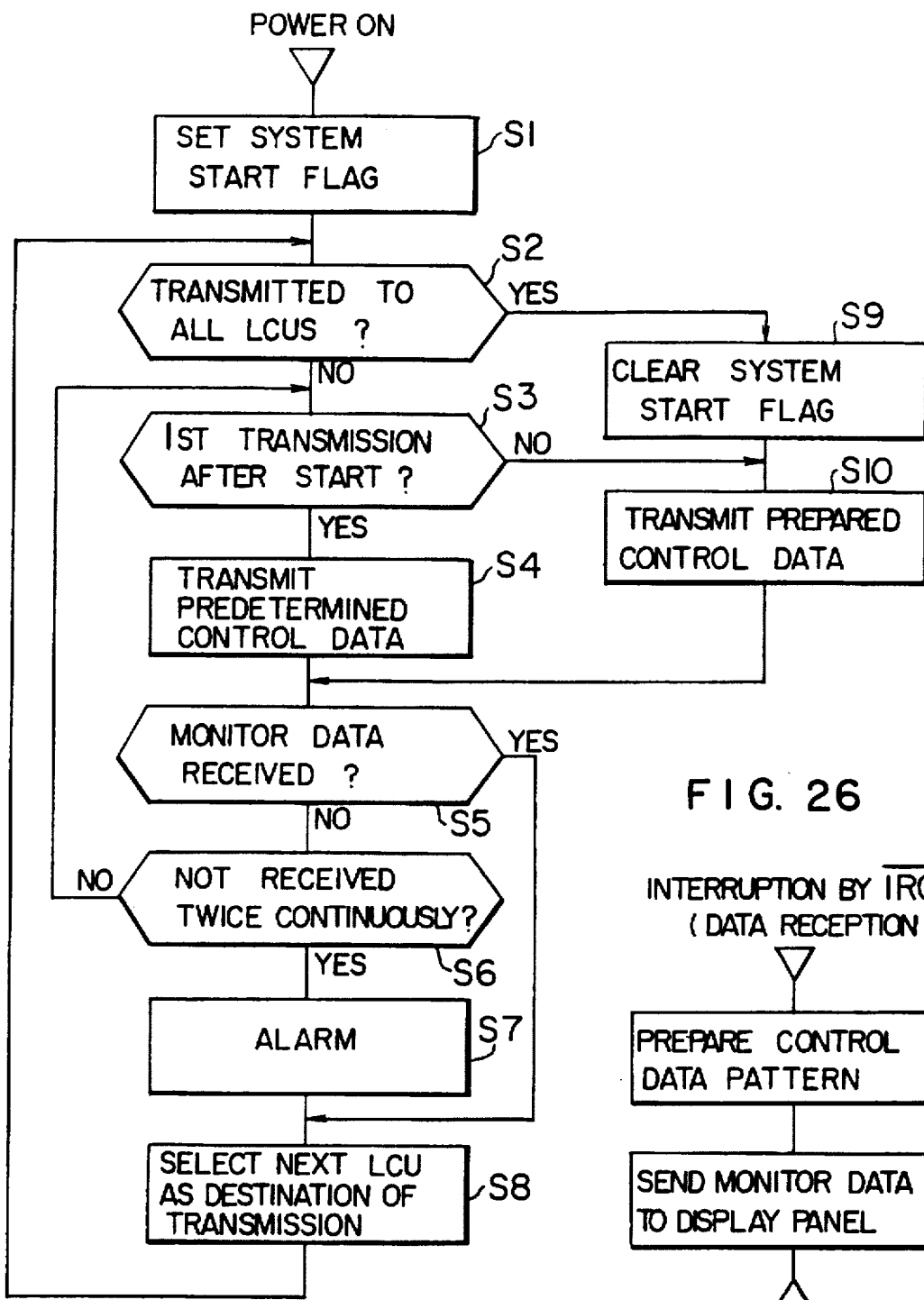
FIGS. 25 and 26 are flow charts for explaining an operation of the central control unit.
Figure 26:
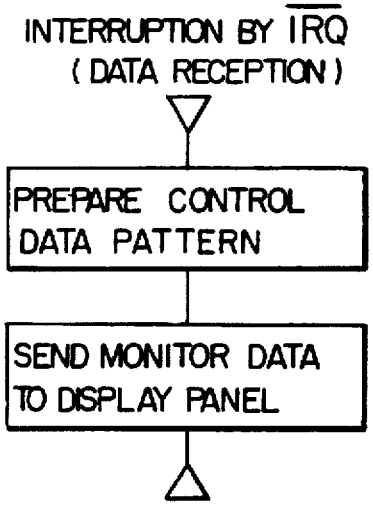

In the present embodiment, because of the steps S5, S6 and S7 of FIG. 25, if the CCU transmits the data to the LCU but cannot receive the monitor data from that LCU, the transmission of the data to the same LCU from the CCU is repeated, and if the CCU receives the monitor data, it is treated as a transient error and the data transmission to the next LCU is started. However, if the monitor data is not received twice continuously, it is treated as the error of the LCU and this is displayed on the DIS 508.

Accordingly, in accordance with the present embodiment, the data response operations of all LCUs are monitored during the data transmission, and if an error occurs, it is checked to see if it is a transient error or not so that the error can be correctly displayed. In the embodiment of FIG. 25, the step S6 checks to see if the monitor data is not received twice continuously, but the number of times is not limited to two and any number of times no smaller than two may be used. When a noise environment is not good and a probability of transient data transmission error is high, the number of times may be 3, 4 or 5, and when the environment is good and the probability of transient data transmission error is low, the number of times may be two as is the case in the above embodiment.

In the embodiment of FIG. 25, the first data transmitted from the CCU to the LCU after the power-on is the specified data prepared for the specified LCU and the control data for other LCUs are prepared based on the monitor data. Alternatively, the data may be prepared for the respective LCUs and the specified data for each LCU may be transmitted in the first transmission to each LCU.

Figure 27:
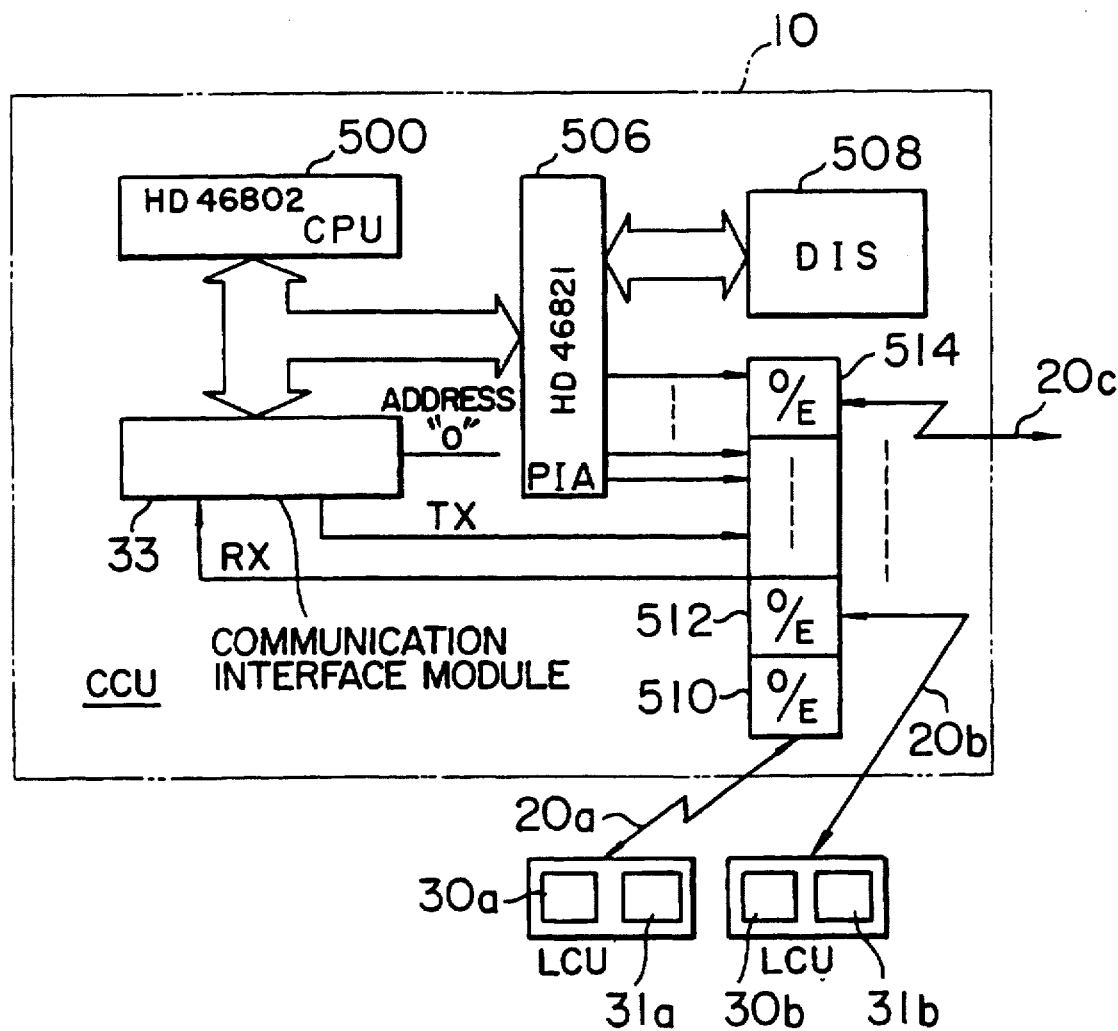
FIG. 27 is a block diagram of another embodiment of the central control unit.

FIG. 27 shows another embodiment of the CCU 10 which is suitable when the number of loads included in the data transmission system is large and a plurality of CIMs are required in the LCM. Numerals 510, 512 and 514 denote O/E (opto-electric conversion modules), numerals 20a, 20b and 20c denote OF signal transmission lines, and numerals 30a, 30b, 31a and 31b denote CIMs set in the DIO mode or AD mode. The other elements are identical to those shown in the embodiment of FIG. 24.

The O/Es 510, 512 and 514 are selected by the PIA 506 to couple one of the OFs 20a, 20b and 20c to the signal transmission lines TX and RX.

Each LCU includes a plural ones of CIMs 30a, 31a, 30b and 31b, which are coupled to the CCU through the independent OFs 20a, 20b and 20c.

The CPU 500 may be HD46802 IC, and the PIA 506 may be HD46821 IC. The HD46821 contains a ROM and a RAM, and hence, it does not need external RAM or ROM.

In the present embodiment, the microcomputer including the CPU 500 controls the O/Es 512–514 through the PIA 506 to designate the LCU to which the data is to be transmitted from the CIM 33. Accordingly, the CIMs having the same address may be provided in the respective LCUs and the number of CIMs in the LCUs may be larger than the number of addresses to enhance the performance of the data transmission system.

As described herein above, according to the present invention, the wasteful waiting time of the microcomputer in the multiple data transmission system using the microcomputer can be effectively utilized and the processing performance of the microcomputer of the CCU of the data transmission system can be fully utilized.

In the above embodiment, one of the plurality of operation modes of the LCU is selectively used. One example of the operation mode is shown in FIG. 5. Accordingly, the application range of the LCU is widened. The terminals of the LCU are used for the different purposes depending on the operation modes. For example, in the DIO mode of FIG. 5, the terminals of the I/O buffer 105 are connected to the switch or the sensor as the detector, or connected to the control means. Thus, a portion of the terminals is used as the output port. On the other hand, in the MPU mode, they are used as the data I/O ports for the MPU. For example, eight of fourteen terminals are used to transmit and receive the data to and from the computer and six terminals are used for the control terminals. In the AD mode, four terminals are used to control the AD converter and the remaining ten terminals are used in the same manner as in the DIO mode. As a result, the number of terminals is reduced and the reliability is improved.

In the present embodiment as shown in FIG. 5, the data represented by the signal bits is switched by the mode. As a result, the application range of the system is widened. Further, since the flip-flops of the shift register 104 are commonly used in the respective modes, the circuit configuration is simplified.

We claim:

1. A communication control system comprising:

a communication control computer for controlling transmission and reception of data between a first communication interface module and a plurality of terminal devices in accordance with a communication control program;

said first communication interface module being connected to said communication control computer and including a first register for temporarily storing data received from and to be transmitted to a terminal device of said plurality of terminal devices; and a second communication interface module composing said terminal device and connected to at least one external load through an I/O buffer, said second communication interface module includes a second register for temporarily storing said data received from said first communication interface module through a communication bus and load data received from said at least one external load through said I/O buffer to be transmitted to said first communication interface module, said load data being indicative of a state of said at least one external load;

wherein said second communication interface module composing said terminal device stores an address of said terminal device and compares the stored address with an address of data transmitted on said communication bus and, when the stored address coincides with the address of the data transmitted on said communication bus, receives the data transmitted on said communication bus and sends said load data indicative of the state of said at least one external load back to said first communication interface module through said communication bus.

2. A communication control system according to claim 1, wherein said load when data received from said terminal device is stored in said first register of said first communication interface module, said communication control computer stores the received load data in a memory unit attached thereto.

3. A communication control system according to claim 1, wherein said communication control computer transmits data in a programmed sequence to said terminal device and receives, from said terminal device, said load data indicative of the state of said at least one external load when said load data is received from said terminal device.

4. A communication interface module used for a communication control system comprising:

- a register for temporarily storing binary-coded communication data which includes address data;
- an address comparator for comparing said address data included in said binary-coded communication data stored in said register with known address data;
- an I/O buffer for receiving said binary-coded communication data from said register when said known address data and the temporarily stored address data are coincident with each other; and
- a control unit for controlling a latch timing of said binary-coded communication data to said register and a reception timing of said binary-coded communication data to said I/O buffer in synchronization with clocks occurring in predetermined periods;

wherein said I/O buffer is provided with a function of outputting said binary-coded communication data stored in said register to an external portion of said communication interface module and a function of inputting data from the external portion of said communication interface module.

5. A communication interface module according to claim 4, wherein said I/O buffer operates as an interface between said communication interface module and an external portion of said communication interface module.

* * * * *